(12) United States Patent
Bos et al.

(10) Patent No.: US 6,396,397 B1
(45) Date of Patent: May 28, 2002

(54) VEHICLE IMAGING SYSTEM WITH STEREO IMAGING

(75) Inventors: Brent J. Bos, Tucson, AZ (US); Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/372,915

(22) Filed: Aug. 12, 1999

Related U.S. Application Data

(63) Continuation-in-part of application No. 09/313,139, filed on May 17, 1999, now Pat. No. 6,222,447, which is a continuation of application No. 08/935,336, filed on Sep. 22, 1997, now Pat. No. 5,949,331, which is a continuation of application No. 08/445,527, filed on May 22, 1995, now Pat. No. 5,670,935, which is a continuation-in-part of application No. 08/023,918, filed on Feb. 26, 1993, now Pat. No. 5,550,677.

(51) Int. Cl.⁷ .................................................. B60Q 1/00
(52) U.S. Cl. .................. 340/461; 340/435; 340/461; 340/903; 340/901; 180/167; 348/118; 348/135; 348/148; 348/42; 701/28
(58) Field of Search ................................. 340/461, 435, 340/901, 903; 180/167; 348/118, 135, 148, 42, 300; 701/28; 250/208.1, 214 A, 300

(56) References Cited

U.S. PATENT DOCUMENTS

| | | | |
|---|---|---|---|
| 5,027,001 A | * 6/1991 | Torbert | 307/10.1 |
| 5,414,461 A | * 5/1995 | Kishi et al. | 348/115 |
| 5,530,420 A | * 6/1996 | Tsuchiya et al. | 340/435 |
| 5,550,677 A | 8/1996 | Schofield et al. | 359/604 |
| 5,670,935 A | 9/1997 | Schofield et al. | 340/461 |
| 5,796,094 A | 8/1998 | Schofield et al. | 250/208.1 |
| 5,837,994 A | 11/1998 | Stam et al. | 250/208.1 |
| 5,850,176 A | 12/1998 | Kinoshita et al. | 340/435 |
| 5,867,591 A | 2/1999 | Onda | 382/154 |
| 5,883,739 A | 3/1999 | Ashihara et al. | 359/462 |
| 5,890,021 A | 3/1999 | Onoda | 396/121 |
| 5,896,085 A | * 4/1999 | Mori et al. | 340/469 |
| 5,990,469 A | * 11/1999 | Bechtel et al. | 250/208.1 |

* cited by examiner

*Primary Examiner*—Julie Lieu
(74) *Attorney, Agent, or Firm*—VanDyke, Gardner, Linn & Burkhart, LLP

(57) ABSTRACT

A vehicular stereoscopic imaging system provides a calculation of a distance between one or more sensors on a vehicle and a light source or object in a target scene remote from the vehicle. The imaging system may be useful in a headlamp dimmer control system, such that the headlamps, are modulated between their low and high beams in response to the calculated distance and intensities and/or colors of the light sources sensed by the sensors. The stereoscopic imaging system determines the distance to the object by comparing similarly classified signals received by each of two imaging array sensors in order to determine a relative position of an image representing the light source on each sensor. The distance to the object or light source may then be calculated as a function of the respective positions on the sensors, the focal lengths of focusing optics associated with each sensor and a predetermined separation distance between the axes of the two sensors. An associated accessory, such as a display, headlamps, windshield wipers, a warning indicator or signaling device and/or the brake system of the vehicle may be adjusted or activated in response to an output of the imaging system.

90 Claims, 12 Drawing Sheets

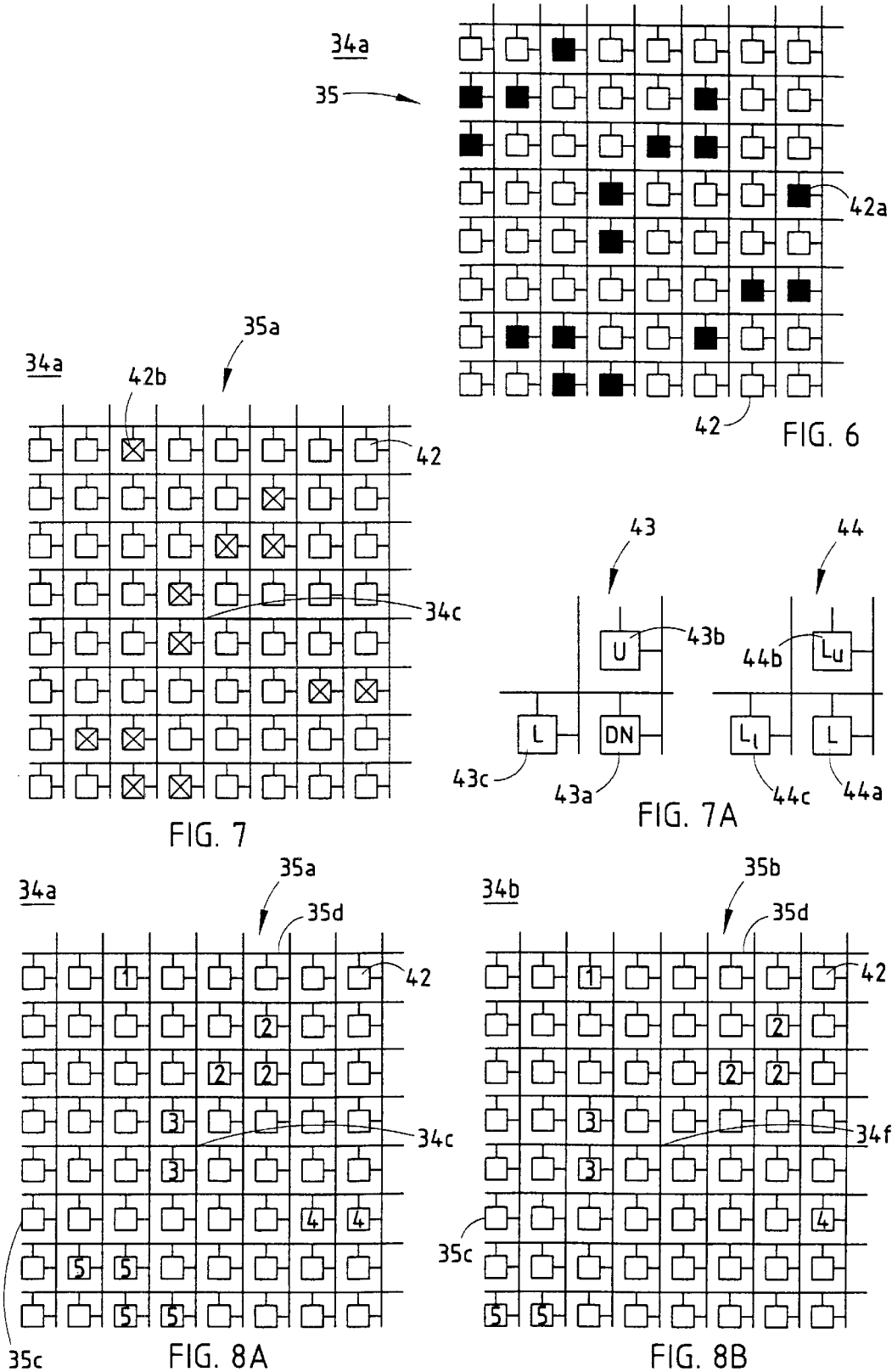

VEHICLE IMAGING SYSTEM WITH STEREO IMAGING

This application is a continuation-in-part of U.S. patent application Ser. No. 09/313,139, filed on May 17, 1999 now U.S. Pat. No. 6,222,447, which is a continuation of application Ser. No. 08/935,336, filed on Sep. 22, 1997 now U.S. Pat. No. 5,949,331, which is a continuation of application Ser. No. 08/445,527 U.S. Pat. No. 5,670,935, filed on May 22, 1995, which is CIP of application Ser. No. 08/023,918 U.S. Pat. No. 5,550,667, filed Feb. 26, 1993 the disclosures of which are hereby incorporated herein by reference.

BACKGROUND OF THE INVENTION

This invention relates generally to vehicular vision systems and, more particularly, to a vehicular vision system which is operable to determine a distance from the vehicle to an object or light source remote from the vehicle. More particularly, the present invention is directed to determining the distance to an object whose image is captured by an image capture device. One application for the imaging system of the present invention is with a vehicle headlamp control and may identify particular light sources of interest and adjust a vehicle's headlamps according to the distance between the vehicle and the particular light sources.

Vehicle camera or vision systems have been proposed for various applications, such as rear and/or side view vision systems, back up aids, collision avoidance systems, rain sensor systems, head lamp control systems and the like. These systems may include a camera or sensor positioned on the vehicle for capturing an image of a scene exteriorly of the vehicle. The vision systems may also include a display for displaying a captured image, or may control an associated accessory on the vehicle, such as windshield wipers, headlamps or even the brake system in response to one or more characteristics of the captured image. In some applications, it has been recognized that distance information between the vehicle and an object in the captured scene may be helpful. In such applications, a ranging device may also be included to provide this information. Various ranging devices have been proposed, such as radar, ultrasonic, sonar, infrared beam/detector devices or similar proximity sensing devices. While such devices provide distance information to the associated vehicular system, this requires an additional sensing device separate from the vehicular vision or camera system, which adds to the bulk and costs associated with the system.

One vehicle system which distance information may be particularly useful is a vehicle headlamp control system for adjusting a vehicle headlamp in response to a detection of oncoming headlamps or leading taillights associated with other vehicles. To date, there have been many proposed headlight dimmer control systems. Many of the prior attempts at vehicle headlight dimming controls include a single light sensor which integrates light from a scene remote from the vehicle. The vehicle headlights are then dimmed when the integrated light exceeds a predetermined threshold. However, these systems typically require a sufficiently low threshold of detection such that many other lower intensity light sources may also be interpreted as headlights or taillights. These systems also have difficulties in reliably detecting taillights of other vehicles traveling ahead of the operative vehicle, since the intensity of taillights is typically substantially less than the intensity of oncoming headlights.

Other proposed headlight dimming controls implement an imaging array sensor which not only senses the light originating from both headlights and taillights, but may further determine the color and intensity of the light, thereby further determining whether the light source is a headlight or a taillight. Such systems are deficient in determining the distance between the sensed light source and the subject vehicle, which would be helpful modulating the headlamps in response to both the sensed light and the distance to the light. One proposed solution is to estimate the distance between the vehicle and the light source in response to the brightness or intensity of the sensed light source, since the detected signal from the light source may at times vary with the square of the distance to the light source. However, such a calculation is only accurate when the sensed light source intensity is within a predetermined level corresponding to a known or assumed intensity of headlamps and is at certain distances. Because the intensity of headlamps and taillamps vary between vehicles and may further vary as the headlamps are modulated between high and low beams and as the brake lights are activated or deactivated, such an estimation of distance may be inaccurate in many cases.

SUMMARY OF THE INVENTION

The present invention provides a vehicular imaging system which is capable of accurately determining the distance from the subject vehicle to an object or light source sensed by the sensors of the imaging system. The distance sensor accurately estimates the distance between the sensed object and the vehicle, while avoiding excessive additional costs and bulk to the vehicle vision and/or control system. In one aspect, the present invention is intended to provide a vehicular headlamp control system which senses oncoming headlights and leading taillights of other vehicles and controls the headlamps of the subject vehicle in response to the sensed light sources and the distance between the vehicle and the sensed light sources. The control system preferably includes ranging capability for determining the distance between the sensed objects and the vehicle. The device preferably is adaptable for use in other vehicular imaging systems associated with the vehicle which may display a distance readout to an operator of the vehicle or may control a vehicle accessory in response to the distance.

According to an aspect of the present invention, a vehicular imaging system comprises at least one imaging array sensor and a control. The imaging sensor is mounted at a vehicle and has stereoscopic distance-sensing capability. The control is responsive to an output of the imaging array sensor in order to capture an image of at least one object external of the vehicle and determine a distance between the imaging array sensor and the object.

Preferably, the imaging array sensor receives a stereoscopic image of a scene remote from the imaging array sensor. The stereoscopic image includes a first image of an object in the scene on a first portion of the imaging array sensor and a second image of the object on a second portion of the imaging array sensor. The control is responsive to the imaging array sensor in order to determine a distance between the imaging array sensor and the object.

In one form, the vehicular imaging system is implemented in a vehicular headlamp control system, such that the headlamps are modulated between high and low beams in response to the distance between the sensed object or light source, which may be representative of an oncoming headlight or leading taillight, and the imaging array sensor.

In another form, the vehicular imaging system includes first and second imaging array sensors such that the first image of the object is received by the first imaging array sensor and the second image of the object is received by the second imaging array sensor. Preferably, a first and second optic element is included along the respective optic paths between the first and second imaging array sensors and the scene. The distance between the object and the sensors may then be determined as a function of a relative position of the image of the object as received on the first and second imaging array sensors and the focal lengths of the first and second optic elements.

According to another aspect of the present invention, a vehicular headlamp control for modulating a headlamp of a vehicle comprises at least one imaging array sensor adaptable to receive a stereoscopic image of a scene remote from the vehicle and a control responsive to the imaging array sensor. The imaging array sensor receives a plurality of images associated with a plurality of light sources associated with the scene. The control identifies light sources of interest and provides a control output to the vehicle. The control calculates a distance between at least one of the light sources and the imaging array sensor and provides the control output in response to the distance. The headlamp control modulates the headlamps of the vehicle in response to the control output.

According to another aspect of the present invention, a rearview vision system for a vehicle comprises at least one imaging array sensor and a control. The imaging array sensor is positioned on the vehicle and is directed outwardly from the vehicle. The imaging array sensor has stereoscopic distance-sensing capability. The control is operable to determine a distance from at least one object exteriorly of the vehicle in response to an output of the imaging array sensor.

These and other objects, advantages, purposes and features of this invention will become apparent upon review of the following specification in conjunction with the drawings.

BRIEF DESCRIPTION OF THE DRAWINGS

FIG. 6 is the same view as FIG. 4, with shading of the pixels indicating pixels sensing an object or light source;

FIG. 7 is the same view as FIG. 6 with similarly illuminated pixels being designated as groups of pixels or segments;

FIG. 7A is a schematic of three-pixel sub-array useful for identifying and labeling the segments illustrated in FIG. 7;

FIGS. 8A and 8B are the same view as FIG. 6 of first and second imaging arrays useful with the present invention, with the similarly illuminated groups of pixels being labeled as discreet groups or segments;

DESCRIPTION OF THE PREFERRED EMBODIMENTS

Figure 1:
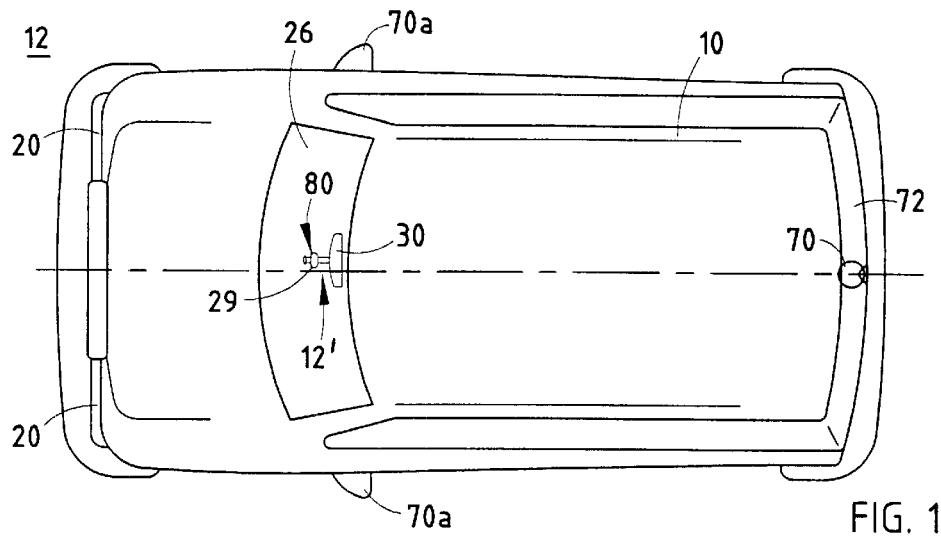
FIG. 1 is a plan view of a vehicle incorporating the present invention.
Figure 2:
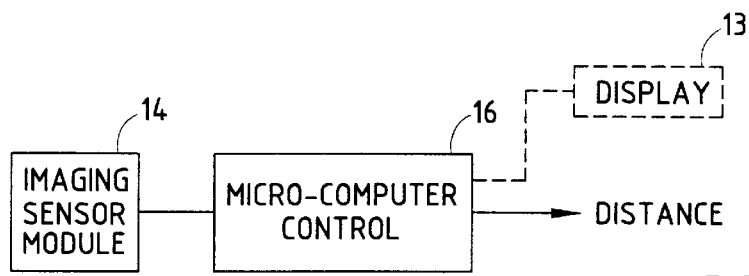
FIG. 2 is a block diagram of the imaging system of the present invention.
Figure 3:
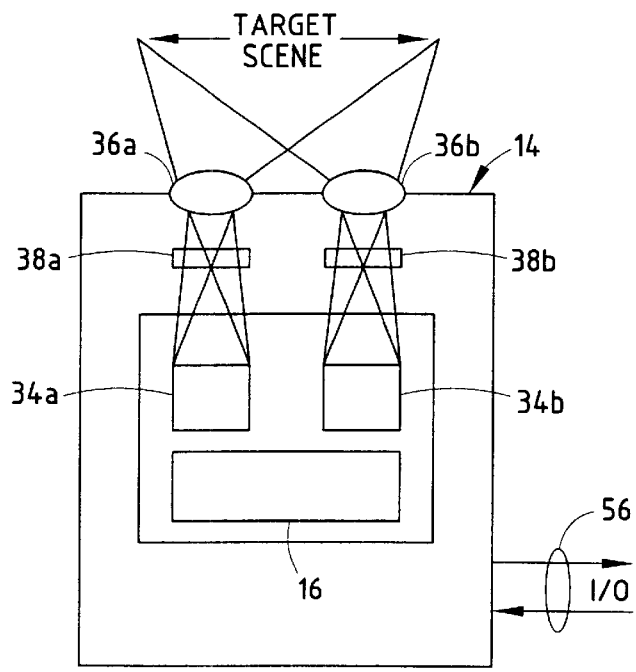
FIG. 3 is a block diagram of an imaging sensor useful with the present invention.

Referring now specifically to the drawings and the illustrative embodiments depicted therein, a vehicle 10 includes a vehicle imaging system 12 which includes an imaging sensor module 14 and an imaging control 16, as shown in FIGS. 1, 2 and 3. Vehicle imaging system 12 may be a rearview vision system of the type disclosed in commonly assigned U.S. Pat. No. 5,670,935, a rearview vision system of the type disclosed in commonly assigned published PCT Application, International Publication No. WO96/38319, published Dec. 5, 1996, a wide angle image capture system of the type disclosed in commonly assigned co-pending U.S. patent application Ser. No. 09/199,907, filed Nov. 25, 1998 by Brent J. Bos, et al., a rain sensor and the like of the type disclosed in commonly assigned published PCT application, International Publication No. WO 99/23828, published May 14, 1999, or a headlamp dimming control of the type disclosed in U.S. Pat. No. 5,796,094, issued to Schofield et al., the disclosures of which are hereby incorporated herein by reference. Imaging sensor module 14 senses light from a scene outside of vehicle 10 and imaging control 16 receives an output from sensor module 14. Imaging array module 14 is operable to facilitate determination of a distance between the module 14 and an object, such as a light source, in the target scene by receiving a stereoscopic image of the object on a pair of imaging sensors 34a and 34b or a divided sensor. By comparing the relative locations or registrations of a particular object or light source in the target scene on each of the imaging sensors 34a and 34b, the distance to the object may be determined as discussed below. Vehicle imaging system 12 may include a display 13 or other means for conveying the distance to an operator of vehicle 10 or may respond to the distance determination by controlling an accessory or device such as a warning indicator or signaling device or even the brake system of the vehicle if the control is associated with a collision avoidance system or the windshield wipers and/or headlamps if the control is associated with a rain sensor and/or headlamp control, respectively. If associated with a headlamp control, the distance is used to detect when headlamps or taillamps are at a distance where the headlamps of the controlled vehicle should be dimmed.

As shown in FIG. 1, a backup aid or rear view vision system 70 may be positioned on a rearward portion 72 of vehicle 10 and may comprise a stereoscopic imaging system. Rear view vision system 70 may alternately be positioned on side rearview mirrors 70a or on the rear view mirror 30 within the vehicle. It is further envisioned that the imaging sensors 34a and 34b may be integrally constructed to a housing or fixed portion of the bracket of the exterior mirror, thereby combining the sensors or cameras within the mirror to form a single unit. The stereoscopic vision system may then determine the distance from the vehicle to an object rearward of the vehicle and provide a distance output to an operator of vehicle 10. The vision system may include a display 13 which provides an operator of the vehicle with an image of the scene remote from the vehicle and a distance readout to an object or objects in the scene.

Preferably, the image may be displayed as a unitary image synthesized from outputs of two or more imaging sensors. Image enhancements may also be provided in the displayed image to further enhance the driver's understanding of the area immediately surrounding vehicle 10. For example, graphic overlays, such as distance indicia in the form of horizontal grid markings or the like, may be provided to indicate distances between the vehicle and objects displayed in display 13. These graphic overlays may be superimposed on display 13 and thus are visible to the operator of vehicle 10. The grid markings may be moved, curved or otherwise adjusted in response to a change in the vehicle's direction of travel, which may be determined by a change in the vehicle's steering system, the vehicle's differential system or a compass heading. Additionally, images of objects or other vehicles may be adjusted or enhanced in response to the distance between vehicle 10 and the other vehicles, such as by flashing or changing the color of images of objects within a threshold distance of vehicle 10. Alternatively, the distance to multiple objects or a distance to a closest object may be displayed on display 13 or otherwise communicated to the vehicle operator. The distance to several objects may be displayed or the operator may select one or more particular objects in the display for which the distance is determined. The selection may be made by a mouse, keypad, joystick or the like.

Alternately, the stereoscopic vision system may be implemented with a rain sensor 80, which may be placed inside the vehicle passenger compartment and directed toward a window or windshield 26. Rain sensor 80 may then be operable to determine a distance from the sensor to the sensed droplets, in order to ensure that the sensed droplets are positioned on the windshield 26 of vehicle 10 and not remotely positioned therefrom, thereby reducing the possibility of a false detection of rain on the windshield.

Figure 14:
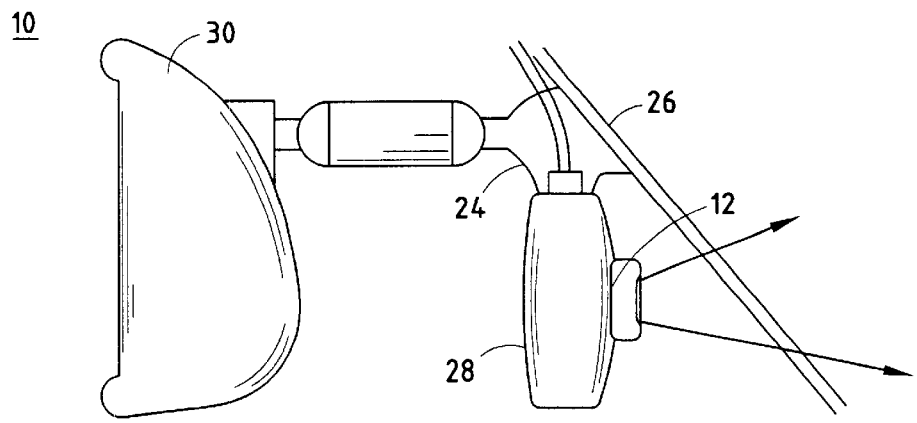
FIG. 14 is a side elevation of a portion of a vehicle embodying a headlamp dimmer control in accordance with the present invention.

As mentioned above, the stereoscopic imaging system is also useful with a vehicle headlamp dimming control 12'. The headlamp control 12' may be implemented in a rearview mirror assembly 30 and directed forwardly of vehicle 10 (FIG. 14). Headlamp control 12' may then adjust or modulate the headlamps 20 of vehicle 10 in response to a distance between the vehicle and oncoming headlamps or leading taillights of other vehicles. This substantially reduces the possibility of modulating the headlamps when the detected vehicle is substantially distant from vehicle 10.

Figure 15:
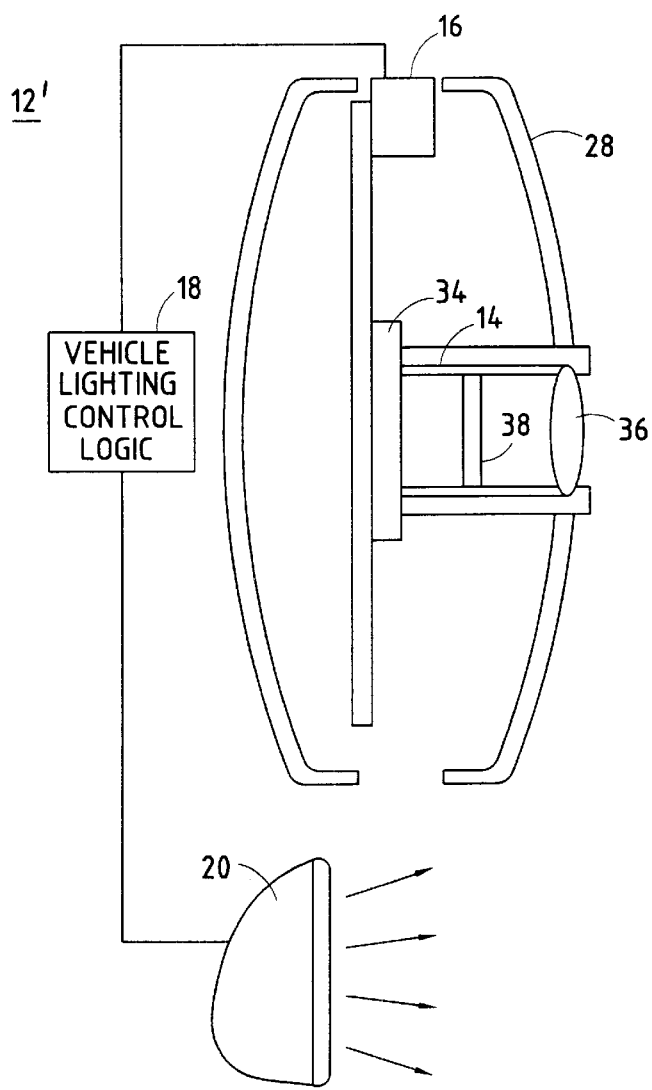
FIG. 15 is a partial side elevation view and block diagram of the vehicle headlight dimming control of FIG. 14.

Referring now to FIG. 3, imaging sensor module 14 preferably includes a pair of imaging array sensors 34a and 34b, each of which receives an image of the target scene via a pair of focusing lenses 36a and 36b and a pair of color filters 38a and 38b, respectively, all of which are positionable along respective optic paths between the target scene and imaging array sensors 34a and 34b. Control 16 receives an output from each imaging array sensor 34a and 34b and converts the output to digital values via an analog to digital converter (not shown) and communicates the values to an appropriate control logic, such as a vehicle lighting control logic module 18 (FIG. 15). Control 16 further functions to at least occasionally activate each imaging array sensor 34a and 34b and analyze the output of each to determine the type of light source sensed and a distance from the vehicle to the light source.

Figure 4:
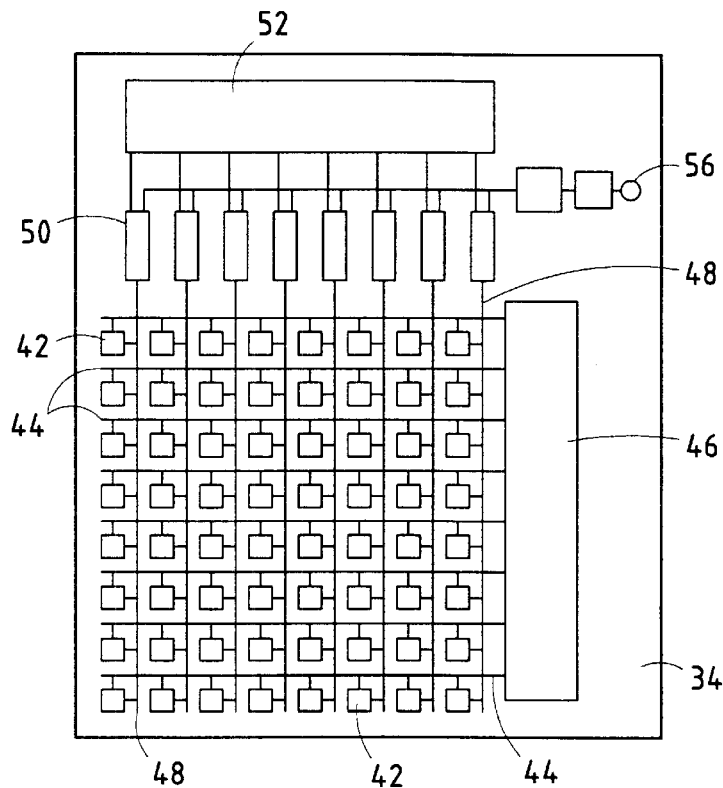
FIG. 4 is a schematic diagram of a light-sensing array useful with the present invention.

Preferably, imaging arrays 34a and 34b are pixilated imaging array sensors, such as a CCD or a CMOS sensor, although other array sensors may be implemented without affecting the scope of the present invention. As shown in FIG. 4, each of the imaging array sensors 34a and 34b are preferably similar to the type disclosed in commonly assigned U.S. Pat. No. 5,550,677 issued to Kenneth Schofield and Mark Larson, the disclosure of which is hereby incorporated herein by reference. Because the imaging array sensors are described in detail in the Schofield '677 patent, the specific details will not be further discussed herein. Briefly, each of the imaging array sensors 34a and 34b preferably comprise a plurality of photon accumulating light sensors or pixels 42. The array of photo-sensors 42 are interconnected to a vertical shift register 46 and a horizontal shift register 52 via a common word line 44 and a common bit line 48, respectively. The bit lines 48 are also interconnected with amplifiers 50. The registers 46 and 52 function to individually access each photo-sensor pixel or element 42 and provide an output 56 associated with the individual signals to the analog to digital converter of control 16.

Figure 5:
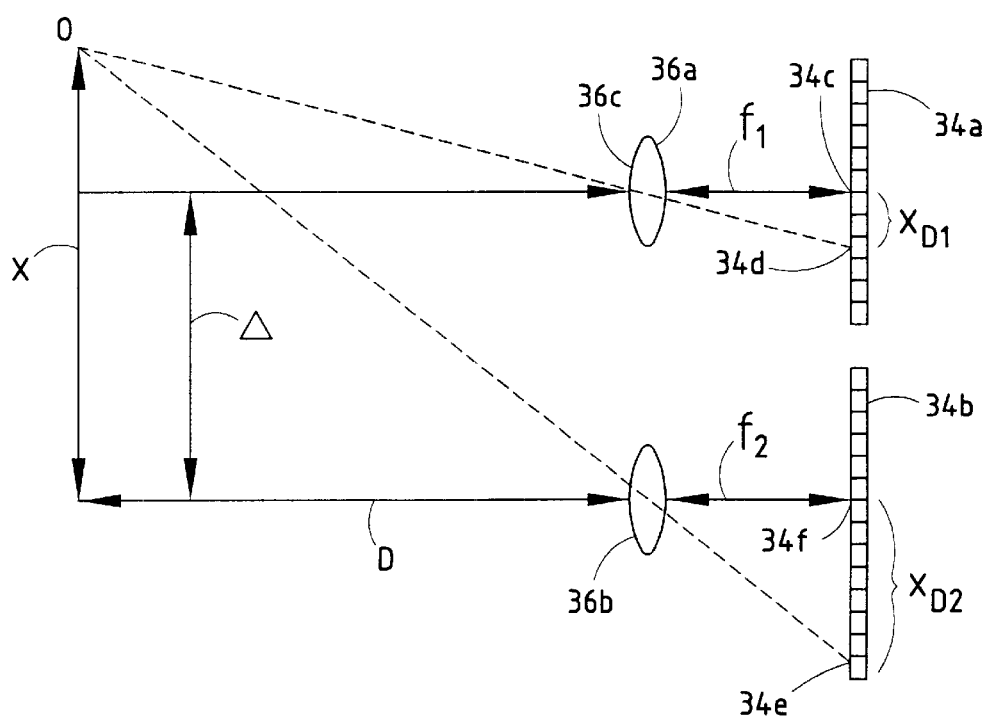
FIG. 5 is the same view as FIG. 3 illustrating the geometric relationship between an object and the imaging sensor useful with the present invention.

As imaging array sensors 34a and 34b receive light from objects and/or light sources in the target scene, control 16 may then be operable to determine a color or other characteristic, such as intensity or size, being communicated by the sensed light sources, which may further be determined to be a desired target object, such as a headlamp or taillight, as disclosed in the Schofield '394 patent. Color filters 38a and 38b may also be used to determine the color of other light sources as well. The color filters may be conventional mosaic filters or the like or may be electro-optic filters of the type disclosed in commonly assigned and co-pending U.S. provisional patent application Ser. No. 60/135,657, filed on May 24, 1999 by Mark L. Larson and Brent J. Bos, the disclosure of which is hereby incorporated herein by reference. By receiving a stereoscopic image on sensors 34 such that one image is received on one array 34a while a corresponding image is received on the second array 34b, the distance to an object in the target scene may then be determined as a function of the locations of each sensed image relative to a respective reference location, such as a center point or axis, of the corresponding imaging array sensors, the separation distance of the two arrays and the focal length of the focusing lenses or optics. This distance may be calculated according to the following equation:

$$D = \frac{\Delta f_1 f_2}{f_1 x_{D2} - f_2 x_{D1}}; \quad (1)$$

where, as represented in FIG. 4, D is the straight-line distance from the sensed object to a forward surface 36c of optics 36a and 36b, $\Delta$ is the lateral separation distance between a mid-point, axis or other reference point associated with each sensor 34a and 34b, $f_1$ is a focal length of the first optic 36a, $f_2$ is a focal length of the second optic 36b, $x_{D1}$ is a directed distance from a center axis 34c of the first sensor 34a to the sensed image 34d of the object O on sensor 34a and $x_{D2}$ is a corresponding directed distance from a center axis 34f of the second sensor 34b to the sensed image 34e of the object O on sensor 34b. The directed distances $x_{D1}$ and $x_{D2}$ may be positive or negative values in accordance with the location where the sensed images 34d and 34e are detected by sensors 34a and 34b, respectively. For example, $x_{D1}$ and $x_{D2}$ may both be positive in FIG. 5, but one or both may be a negative value if the object O is positioned relative to the optics and sensors such that one or both sensed images 34d and 34e are received by sensors 34a and 34b on the other side of the center axes 34c and 34f, respectively.

Once the distance D is known, the lateral distance X to the object O may also be determined by the equation:

$$X = \frac{Dx_{D2}}{f_2} \qquad (2)$$

Similarly, the angle from the vehicle to the object O may easily be calculated by taking the inverse tangent of the lateral distance X divided by the longitudinal distance D or of the image position $x_{D2}$ divided by the focal length $f_2$. Control 16 may then determine if the sensed object or light source is within a predetermined tolerance band of a targeted object or light source, such as a typical headlamp or taillight, both in intensity and in location (lateral and longitudinal distance) relative to vehicle 10. If the intensity and distance of the signal is within the tolerance or threshold levels, the signal may be determined to be one of the targeted objects and imaging system 12 may respond accordingly. For example, if imaging system 12 is associated with a vehicle headlamp control, imaging system 12 may adjust the headlamps 20 of vehicle 10 in response to a distance and angle between vehicle 10 and the detected headlamps and/or taillights of other vehicles.

Referring now to FIGS. 6 through 8, the following illustrates and describes the processes through which control 16 may determine the distance between a light source or other sensed object and the vehicle 10. As shown in FIG. 6, the arrays 35a and 35b of the respective imaging array sensors 34a and 34b include pixels 42, which sense light values representative of light sources and other objects present in the target scene. Although shown as an array comprising an 8×8 array of pixels, the array is shown here as a small array for purposes of clarity only, since typical imaging array sensors useful with the present invention may comprise approximately 512×512 pixel arrays or more. The pixels 42 are shown with shaded pixels 42a representing sensed light values which are greater than a predetermined noise level associated with the array sensors 34a and 34b.

When operable, control 16 may shutter or open each of the imaging array sensors 34a and 34b to collect the signals from the target scene on each array 35a and 35b. After the signal has been received and communicated to control 16, control 16 may function to identify and classify each of the pixels in accordance with their intensity and color as determined by control 16 and pixel assignment with respect to color filters 38a and 38b. For example, white pixels may be identified and analyzed to determine whether the white pixels are headlamps of oncoming vehicles, and then red pixels may be identified and analyzed to determine whether the red pixels are tail lights of the leading vehicles traveling in the same direction ahead of the subject vehicle 10. Clearly, however, the pixels may be classified and analyzed according to other colors or intensities for determining the distance to other objects or light sources within the targeted scene, without affecting the scope of the present invention.

As shown in FIG. 7, similarly illuminated pixels, having a similar color and/or intensity, are similarly classified, such as red or white, and are shown as pixels 42b with an "x" through them. Not all of the shaded pixels 42a in FIG. 6 are similarly classified in FIG. 7 because some of the shaded pixels 42a may represent a light value above the noise threshold but from a different colored light source. The similarly classified pixels 42b may then be assigned a value of one or otherwise labeled, while the other blank pixels 42 may be assigned a value of zero, for the purpose of determining connected segments or groups of pixels corresponding to each particular light source in the target scene. This is preferably accomplished by activating a segmentation and labeling algorithm or process 100 which determines which of the classified pixels 42b belongs to each particular segment or light source and labels each segment in numeric order. Each segment of pixels within a particular classification, such as white, red or other color, is thus labeled as a discreet segment from the other pixels or segments of pixels with the same classification. Labeling algorithm 100 preferably analyzes each pixel and compares the assigned value (such as one or zero) of each pixel to one or more neighboring pixels. A set of neighboring pixels is represented by a three-pixel window or sub-array 43 (FIG. 7A) which may be applied to each of the imaging arrays 35a and 35b. The sub-array 43 is preferably moved through the array, starting at an upper left corner and proceeding left to right and then downward until each pixel in the array has been analyzed and compared to its neighboring pixels.

As sub-array 43 moves through arrays 35, each pixel 42 and 42b is individually analyzed by a leading pixel window 43a to determine if the individual pixel has been assigned a value of one. If the pixel is assigned as one, each of the neighboring upper and left pixels are also analyzed by an upper and left pixel window 43b and 43c, respectively, in order to determine if an individual pixel that is assigned a value of one is connected with one or more previously analyzed pixels similarly assigned a value of one. A labeling window or sub-array 44 then futher analyzes the individual pixel with a labeling pixel window 44a and the upper and left adjacent pixels with labeling pixel windows 44b and 44c, respectively. Labeling sub-array 44 determines and compares the designated segment number for each of the previously analyzed neighboring or adjacent pixels and labels the subject individual pixel accordingly. For example, if either the upper or left pixel were also assigned a value of one, then that particular pixel would already be labeled as a segment by labeling sub-array 44. Accordingly, labeling sub-array 44 would label the subject pixel with the same segment number as already applied to its neighboring pixel. If the upper and left pixels are labeled differently, the left pixel would then be re-labeled to match the upper, or first labeled, pixel. Pixels within a connected segment are thus labeled in accordance with that particular segment number by labeling sub-array 44. This process is continued for each pixel in array 35. Clearly, however, other processes for analyzing and labeling neighboring pixels may be performed without affecting the scope of the present invention. Furthermore, although labeling algorithm 100 is described as analyzing and labeling segments which include only pixels which have adjacent or connected sides, other algorithms may be implemented which label segments which have pixels adjacent at their corners or within a predetermined range and/or intensity of each other.

After the three pixel windows 43 and 44 have completed analyzing and labeling each of the pixels 42 within the imaging arrays, each of the discreet segments are grouped together and labeled numerically, as shown in FIGS. 8A and 8B for imaging array sensors 34a and 34b, respectively. The average pixel location and maximum intensity of each segment may then be determined in order to facilitate a comparison of the segments on their respective sensors. This is accomplished by summing the x and y pixel coordinates for the pixels within each segment and dividing each sum by the number of pixels within the segment. For example, segment number (2) in FIG. 8A would have an average x position of 5.67

$$\left(\frac{5+6+6}{3}\right)$$

from a left edge 35c of array 35a and an average y position of 2.67

$$\left(\frac{2+3+3}{3}\right)$$

from an upper edge 35d of array 35a. Because the two imaging sensors 34a and 34b are separated by a predetermined distance, each of the particular segments representing a particular light source may be positioned differently on imaging array sensor 34b as compared to a corresponding segment on the other imaging array sensor 34a, depending on the distance and lateral orientation between the sensors and the light source in the targeted scene. This is represented in FIG. 8B, where segment number (2) is received by sensor 34b such that it has an average x position of 6.67

$$\left(\frac{6+7+7}{3}\right)$$

and the same average y position as the segment had on the sensor 34a in FIG. 8A. The distance may then be calculated using equation (1) above, where $x_{D1}$ and $x_{D2}$ are the directed distances from a reference point or center axis 34c and 34f of each sensor 34a and 34b to the average position of the particular segment on each sensor. In this example, $x_{D1}$ may be a distance corresponding to separation of 1.67 pixels while $x_{D2}$ may be a distance corresponding to a separation of 2.67 pixels, with the center axes 34c and 34f being at the center of the depicted arrays. Vehicle imaging system 12 may then determine if the intensity and location of the segments are consistent with the relevant or targeted images or light sources, such as headlamps or taillights, and may display an image or readout or adjust an associated accessory of vehicle 10 accordingly.

Although described as preferably utilizing segmentation and averaging algorithms, the present invention may alternatively compare individual pixels on one array to similarly illuminated individual pixels on the other array. Because the preferred embodiment groups similarly classified and positioned pixels together into segments and determines a maximum intensity and average location of the segment, the preferred system provides improved accuracy for distance calculation over a comparison of individual pixels. This is because the measurement resolution is then not limited to a pixel separation distance, since the average or center location of the sensed light source may be somewhere between two or more pixels. Accordingly, the preferred control of the present invention provides sub-pixel resolution in the distance calculation.

Figure 9:
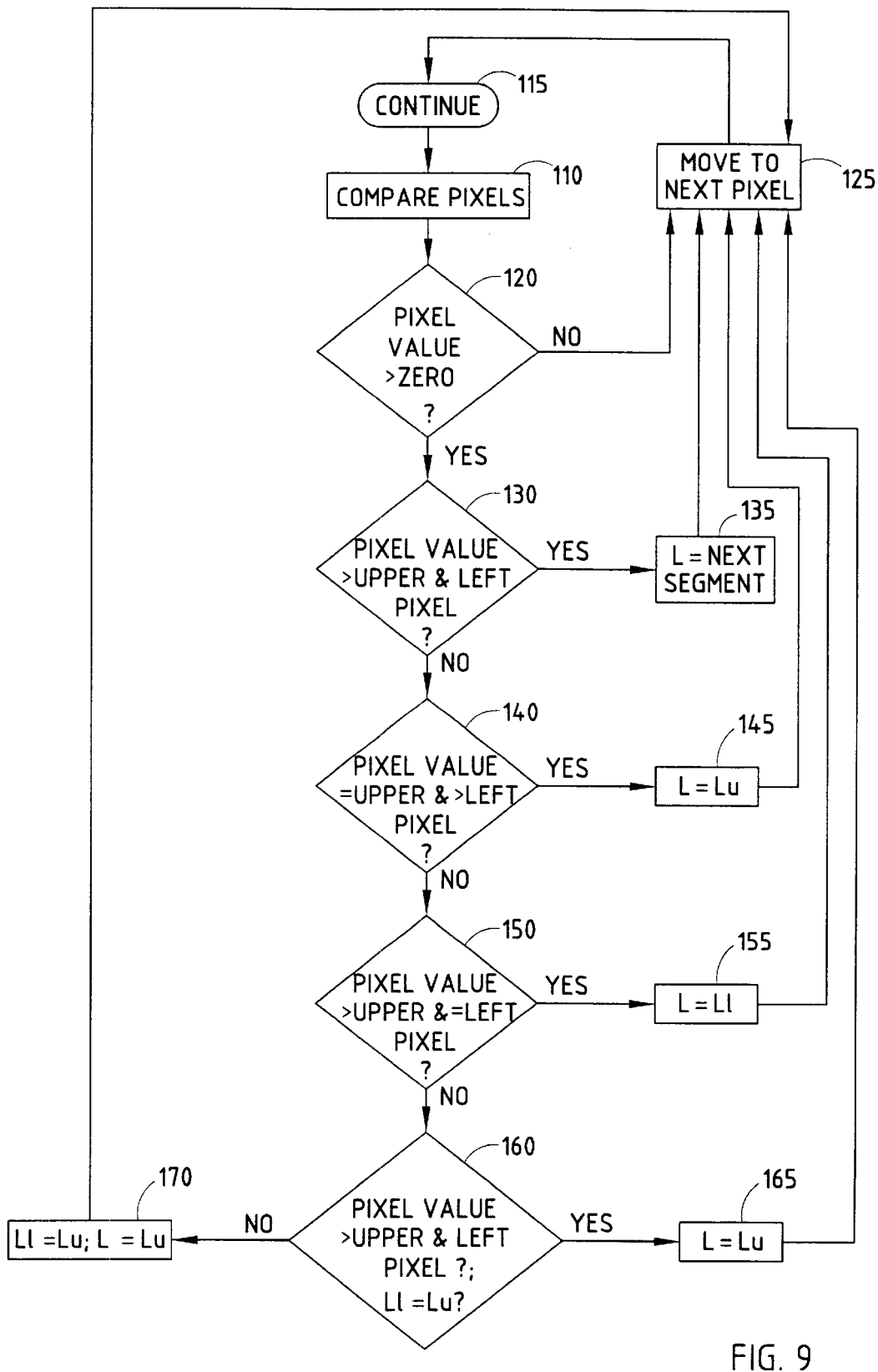
FIG. 9 is a flow-chart of a segment labeling process useful with the present invention.

Referring now to FIG. 9, labeling algorithm or process 100 determines and labels the segments of similarly classified pixels on each imaging array sensor. Process 100 starts at 110 and compares each individual pixel to at least two neighboring pixels. If it is determined at 120 that the target pixel has not been assigned a value of one, or is not above a threshold value, then process 100 moves to the next pixel at 125 and continues at 115. If it is determined at 120 that the target pixel value is greater than the threshold value or, in other words, has been assigned a value of one, then it is further determined at 130 whether the pixel value is greater than the values associated with both an upper adjacent pixel and left adjacent pixel. If it is determined at 130 that the pixel value is greater than both of the upper and left pixels, then that particular pixel is assigned a new segment number at 135 and process 100 moves to the next pixel at 125 and continues at 115. If it is determined at 130 that the pixel value is not greater than both the upper and left pixel, then it is further determined at 140 whether the pixel value is equal to the upper pixel and not equal to the left value. If the pixel value is equal to the upper pixel and is not equal to or is greater than the left pixel, then the particular pixel is assigned the same segment number as the upper pixel at 145 and the process 100 moves to the next pixel at 125 and continues at 115.

If it is determined at 140 that the pixel value is not equal to the upper pixel or is equal to the left pixel, then it is further determined at 150 whether the pixel value is both equal to the left pixel and is not equal to or is greater than the upper pixel. If it is determined at 150 that the pixel value is equal to the left pixel and is not equal to the upper pixel, then the particular pixel is assigned the same segment number as the left pixel at 155, and process 100 moves to the next pixel at 125 and continues at 115. If it is determined at 150 that the pixel value is not equal to the left pixel value or is equal to the upper pixel value, then it is further determined at 160 whether the pixel value is equal to both the left and upper pixels and the left and upper pixels are labeled the same. If it is determined at 160 that the pixel value is equal to the left and upper assigned values and the left and upper pixels are labeled the same, then the particular pixel is labeled the same as the upper pixel at 165. Process 100 then moves to the next pixel at 125 and continues at 115. If, however, the left label is not equal to the upper label at 160, then the particular pixel is labeled the same as the upper pixel and the left pixel is correspondingly relabeled to the same as the upper pixel at 170, since the target pixel now joins the left and upper pixel within the same segment. Process 100 then moves to the next pixel to 125 and continues at 115 until each pixel within each imaging array sensor has been analyzed and labeled accordingly. Process 100 may be performed one or more times on each of the pixelated imaging array sensors in order to provide optimal results.

Figure 10:
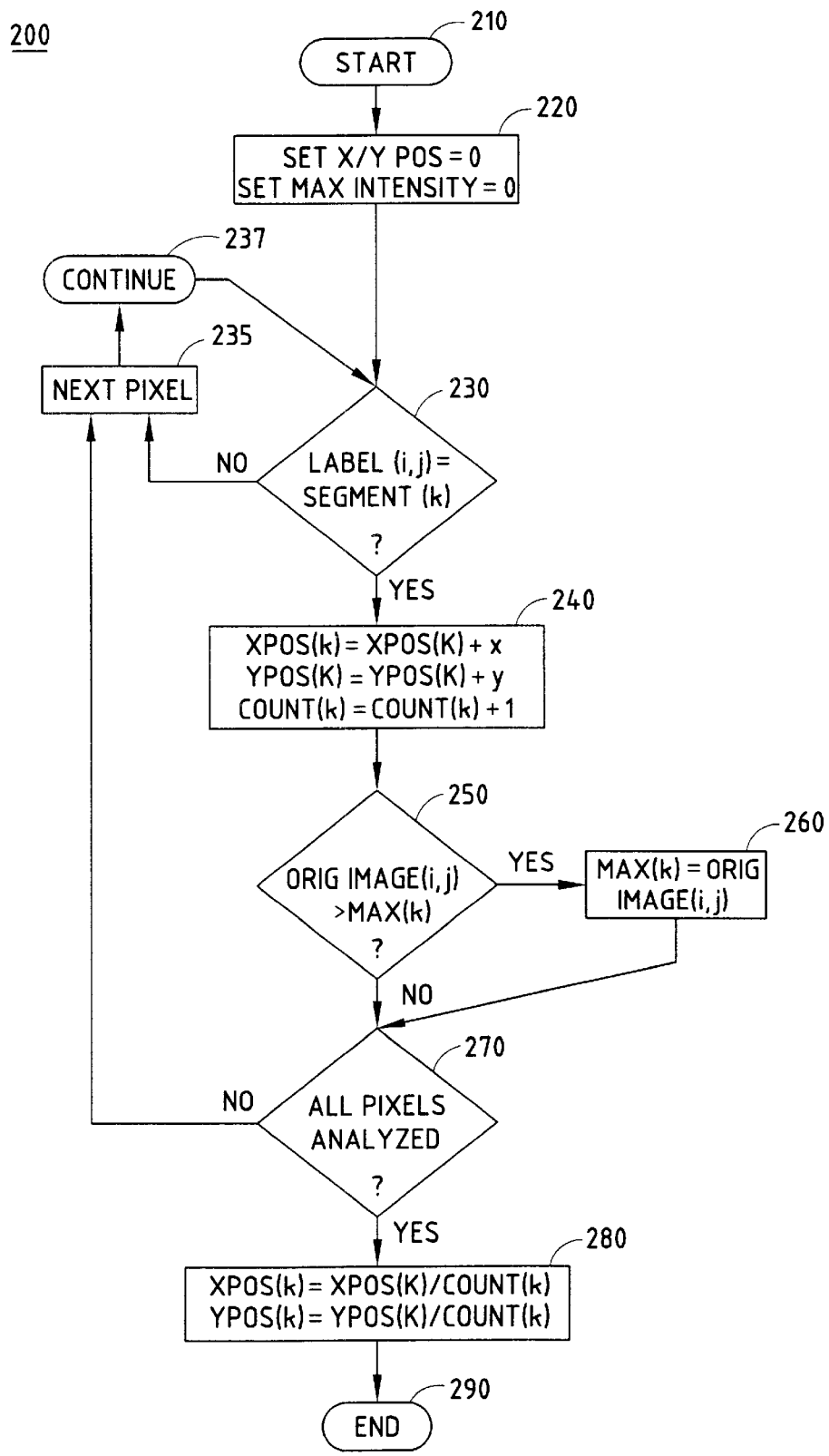
FIG. 10 is a flow-chart of a process for determining the position and intensity of the segments.

After labeling process 100 has been performed on each of the pixelated imaging array sensors 34a and 34b, the pixels are labeled according to the segments or groups of pixels associated with particularly classified light sources. Once each particular segment is labeled on each sensor, additional algorithms or processes may be performed by control 16, in order to determine a location and intensity of each segment with respect to the particular sensor. As shown in FIG. 10, a position and intensity process 200 determines an average x and y position of each segment relative to its respective sensor and a maximum intensity associated with each segment. Process 200 analyzes each pixel in each array and starts at 210. Process 200 sets each position and intensity value for each segment to zero at 220. If it is determined at 230 that the label for the pixel being analyzed is not equal to one of the previously designated segment numbers, then process 200 moves to the next pixel at 235 and continues at 237. If, on the other hand, the label associated with the particular pixel is equal to one of the segment numbers, then the x position and y position values for that segment are summed at 240. The x position value for the particular segment is the sum of the previously calculated x position value for that segment plus the x ordinate for the particular pixel relative to the sensor array. The y position value for that segment is similarly calculated and a counter value is increased by one at 240.

It is then determined at 250 whether an image intensity value for that pixel is greater than the maximum intensity value associated with that particular segment. If the pixel intensity value is greater than the maximum intensity for that segment, then the maximum intensity value for that segment is set to the sensed image intensity value for the particular pixel at 260. It is then determined at 270 whether all the pixels on each array have been analyzed. If it is determined at 270 that not all the pixels have been analyzed, then process 200 moves to the next pixel at 235 and continues at 237. If it is determined at 270 that the pixels have all been analyzed, then an average x position and y position associated with each segment is then calculated at 280 by dividing the summed x and y position values for each segment by the corresponding count value for each particular segment. The process ends at 290. Upon completion of process 200, an average x and y position and a maximum intensity associated with each segment is stored for comparison with the positions and intensities sensed by the other array sensor. The positional values may be converted to conventional units of measurement for use in the distance calculations of equation (1).

Figure 11:
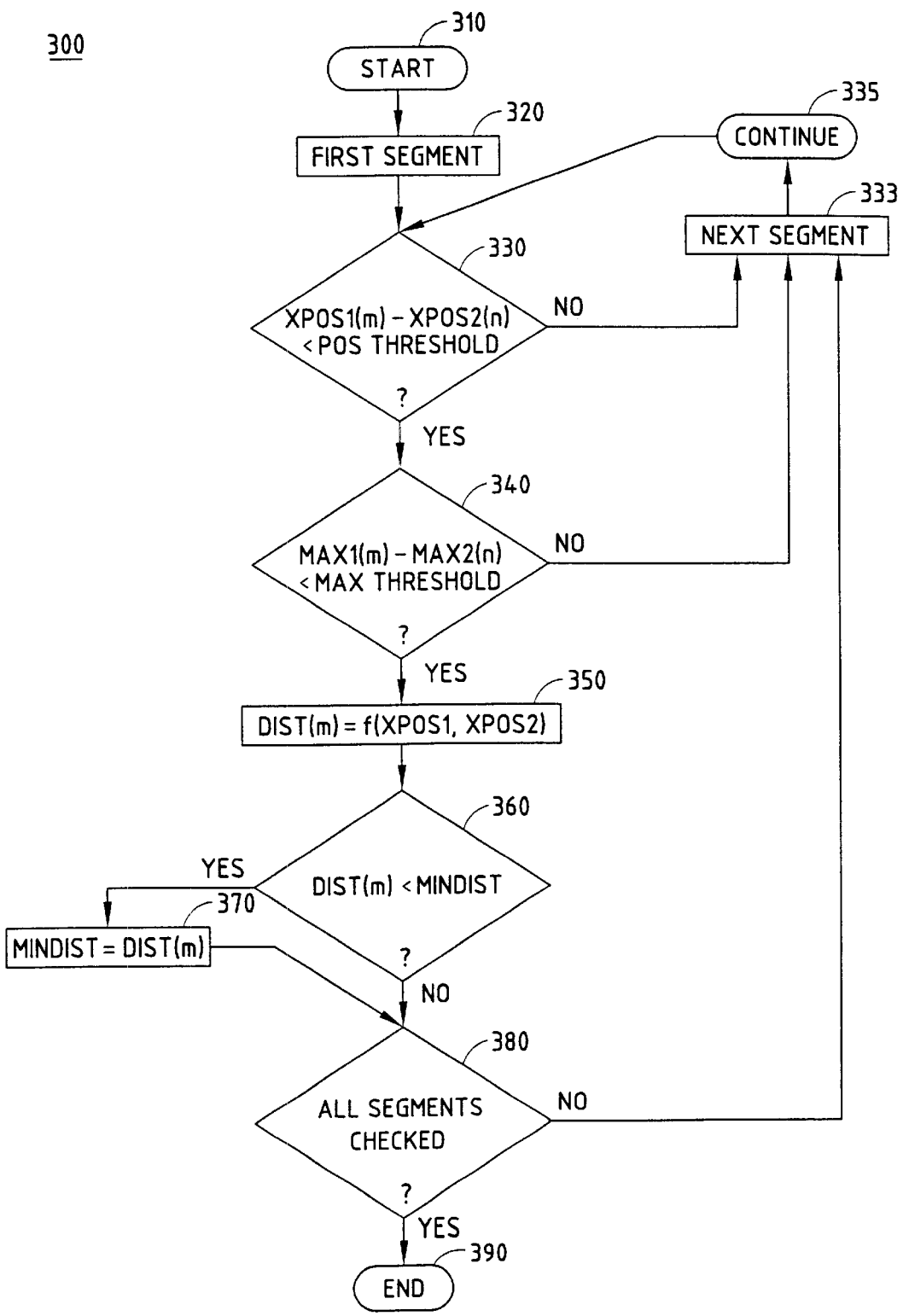
FIG. 11 is a flow-chart of a process for determining whether a particular segment on a first imaging array sensor is an image of the same object as a corresponding segment on a second imaging array sensor.

Referring now to FIG. 11, a distance algorithm or process 300 compares the average positions and intensities of each segment to corresponding segments on the other sensor 34b in order to determine whether a segment on the first sensor 34a represents the same object or light source as a corresponding segment on the second sensor 34b. Process 300 begins at 310 and selects a first segment at 320. If it is determined at 330 that an average x position and y position of the segment on the first sensor is within a predetermined position threshold of the average x position and y position of a segment on the second sensor, then it is further determined at 340 whether the maximum intensities associated with each segment on each sensor are within a maximum intensity threshold. If the average x and y positions are not within the position threshold at 330, then the process 300 moves to the next segment at 333 and continues at 335. Likewise, if the maximum intensities are not within the maximum intensity threshold at 340, the process moves to the next segment at 333 and continues at 335. If the average x and y positions are within the position threshold at 330 and the maximum intensities are within the maximum intensity threshold at 340, a distance to that object or light source is calculated at 350, preferably as a function of the x positions of the sensed light source on both sensors according to equation (1), discussed above.

Because the vehicle imaging system 12 of the present invention preferably adjusts or controls an accessory of vehicle 10 in response to the closest object or light source sensed by sensors 34a and 34b, it may also be determined at 360 whether the calculated distance is less than a lowest distance for all segments. This provides the system with the distance to the closest object or light source that has been classified by control 16. If it is determined at 360 that the distance is less than a lowest distance value, then the lowest distance value is set to the newly calculated distant value at 370. It is then determined at 380 whether all the segments have been accounted for. If it is determined at 380 that not all the segments have been accounted for, the process moves to the next segment at 333 and continues at 335. If, on the other hand, it is determined at 380 that all the segments have been accounted for, the process ends at 390. Upon completion of process 300, the least distance from the vehicle 10 to a sensed object or light source which is in a selected classification and within a position and maximum intensity threshold is stored for use by the imaging control 16. Control 16 may then function to display a distance readout or adjust the appropriate accessory of vehicle 10 in response to the intensity of the light source sensed and/or the calculated distance to that light source. Algorithms 100, 200 and 300 may then be repeated for different classifications of light sources. For example, segments may be classified as white or red light sources for headlamps or taillights or any other color which may be of interest to an operator of the vehicle.

Figure 12:
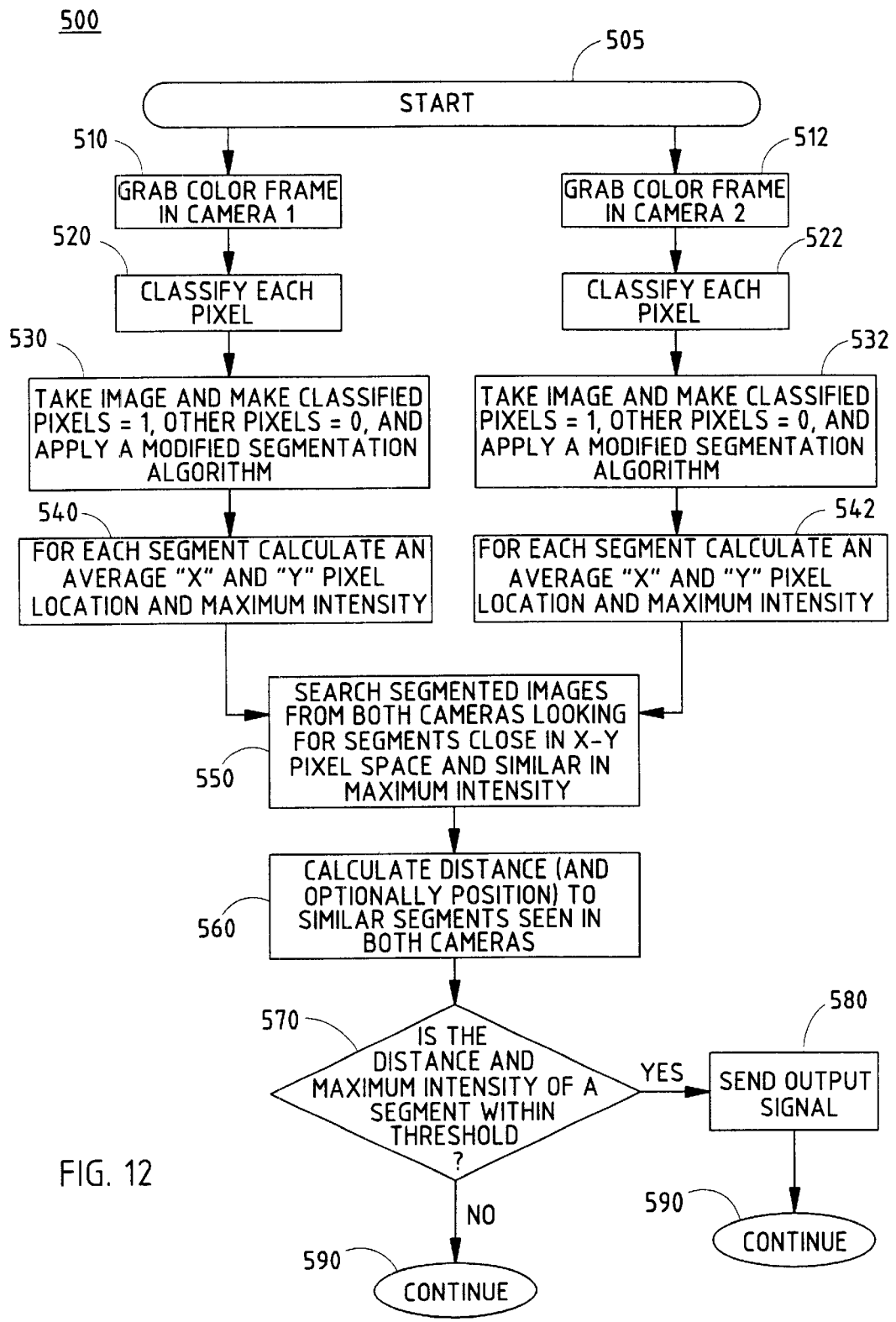
FIG. 12 is a flow-chart of the stereoscopic distance determination function of the present invention.

Referring now to FIG. 12, a process 500 is shown which calculates a distance from an imaging array sensor or sensors to an object or light source sensed by the sensors and provides an output signal in response to the distance and intensity of the light source. The output signal may be in the form of a distance display or may provide an activation signal to a control, depending on the particular application of the stereoscopic imaging process 500. Process 500 begins at 505 and grabs a color frame in each sensor or camera at 510 and 512. each pixel is then classified according to a desired color or other characteristic at 520 and 522. The classified pixels are assigned a value of one, while the remaining pixels are assigned a value of zero and a segment labeling algorithm similar to process 100 discussed above is performed at 530 and 532 for the respective sensors. Clearly, however, the classified pixels may be designated in other manners, without affecting the scope of the present invention. The average x and y pixel locations and maximum intensity of each segment are then determined at 540 and 542. Process 500 then compares the segmented images from both sensors at 550 and calculates the distance to the light source corresponding to the similar segments in both sensors at 560. The angular or lateral position of the object or light source may also be determined at 560. It may then be determined at 570 if the distance and maximum intensity of a particular segment are within a predetermined threshold. If the distance and maximum intensity are within the threshold levels, then an appropriate output signal is sent at 580 and the process continues at 590. If, on the other hand, the distance and/or maximum intensity are not within the threshold at 570, then the process may continue at 590.

Figure 13A:
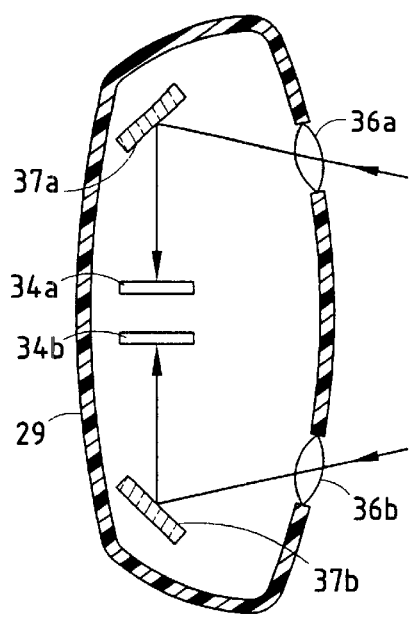
FIGS. 13A–C are schematics of various embodiments of a stereoscopic imaging sensor with distance determining capability within a housing, such as an interior rearview mirror assembly housing.
Figure 13B:
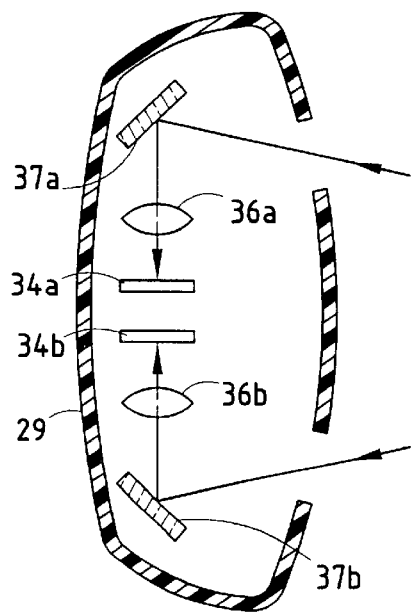
Figure 13C:
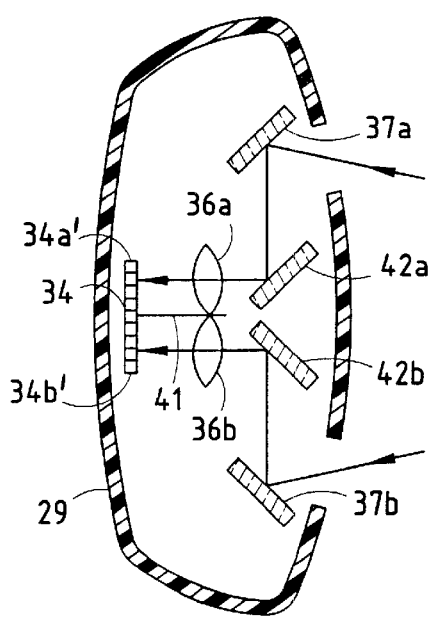

Although shown in FIG. 3 as having sensors 34a and 34b and lenses 36a and 36b positioned such that their optic paths are substantially parallel, clearly other orientations are within the scope of the present invention. For example, as shown in FIG. 13A, two oppositely facing sensors 34a and 34b may be implemented within a housing 29 or the like such that a pair of flat reflective surfaces or mirrors 37a and 37b are positioned along the respective optic paths between the lenses 36a and 36b and the sensors 34a and 34b. Alternately, a pair of openings 39a and 39b may be provided in the housing 29 to allow light to pass therethrough such that it is redirected by the flat reflective surfaces 37a and 37b toward the respective sensors 34a and 34b. The focusing lenses 36a and 36b may then be positioned along the respective optic paths between the flat reflective surfaces 37a and 37b and the sensors 34a and 34b (FIG. 13B). In another alternate orientation, a single imaging array sensor 34 may be implemented within housing 29 to receive a stereoscopic image of the scene remote from the vehicle. A divider 41 may be implemented substantially adjacent to sensor 34 to divide sensor 34 into separate and distinct sensing arrays 34a' and 34b' (FIG. 13C). An additional pair of flat reflective surfaces or mirrors 42a and 42b may also be included to redirect the image rays toward sensor 34 via focusing lenses 36a and 36b. Clearly, however, the scope of the present invention includes other orientations where the lenses and one or more reflective surfaces may be implemented along an optic path between one or more sensors and the target scene.

Although vehicle imaging system 12 is useful in various imaging system applications, the control is particularly useful with a vehicle headlamp dimming control 12' (FIGS. 14 and 15). Vehicle headlamp control 12' may then classify the pixels as red, white or black and correspondingly identify the light sources as taillights or headlamps, using the principles disclosed in commonly assigned U.S. Pat. No. 5,796,094, referenced above. Headlamp control 12' may determine the distances between vehicle 10 and the identified taillights and headlamps and communicate this information to a vehicle lighting control logic module 18 (FIG. 15). Vehicle lighting control logic module 18 may then exchange data with control 16 to control headlamps 20 of vehicle 10 in response to the output of sensor module 14 as received by imaging control 16. Imaging control 16 may analyze detected light sources to determine a color and/or intensity of the light sources and to determine a distance between the light sources and vehicle 10. This information may then be communicated to lighting control logic module 18 for dimming of headlamps 20. Dimmer control 12' thus may correspondingly control the headlamps 20 in response to the color or intensity of the light sources as well as the distance to the light sources. Additional criteria may also be considered, such as the lateral position of the sensed light sources with respect to the vehicle or other criteria associated with size, color, position, intensity or rate of approach of the light source.

Preferably, as shown in FIG. 14, imaging sensor module 14 may be fixedly mounted in housing 28 by a bracket 24 mounted to, or near, the vehicle's windshield 26. Sensor module 14 may be mounted within housing 28 in various orientations, as discussed above with respect to FIGS. 13A–13C. Bracket 24 may also mount an interior rear-view mirror 30. However, imaging sensor module 14 may be mounted elsewhere on the vehicle without affecting the scope of the present invention.

Figure 16A:
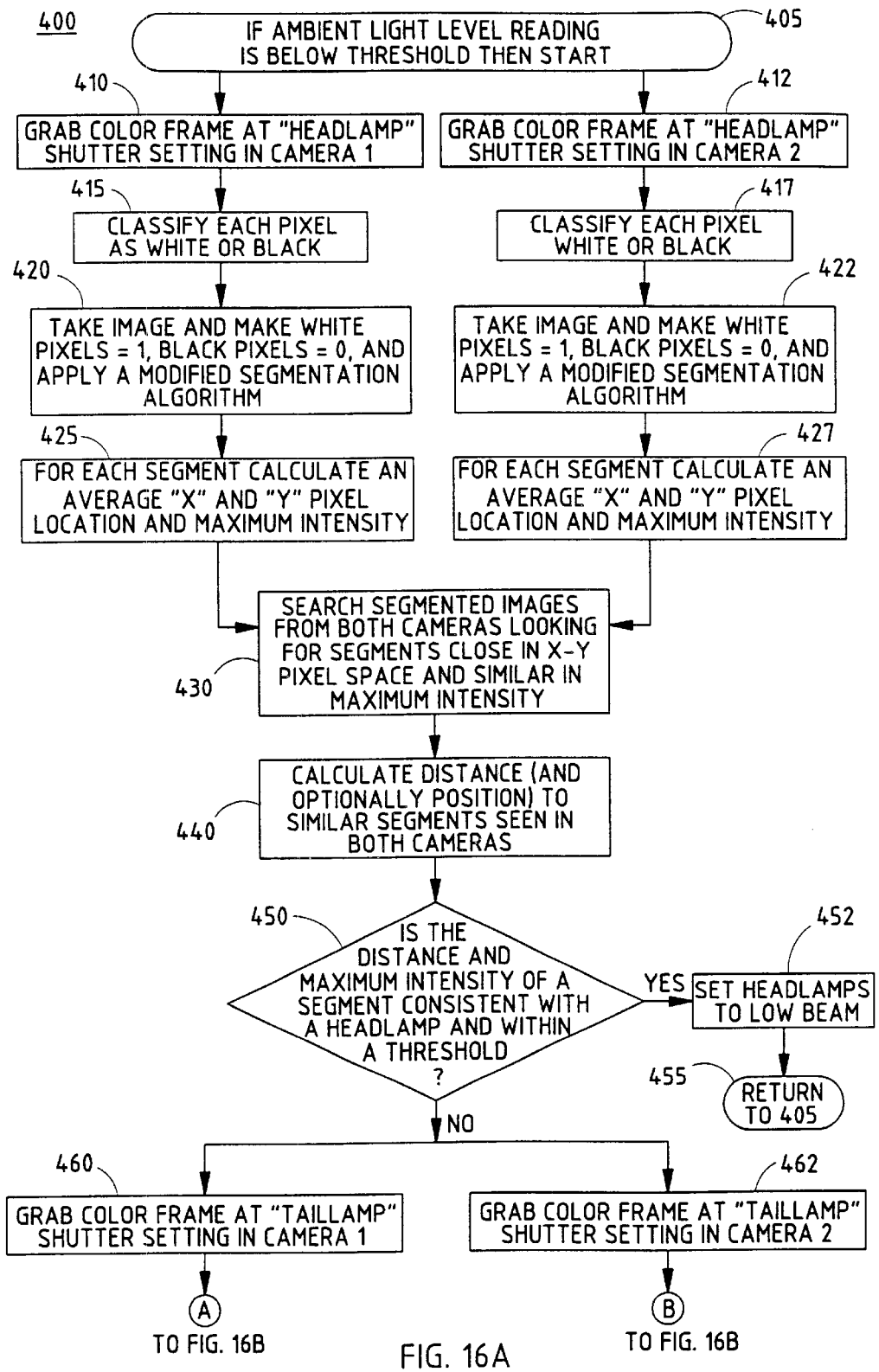
FIGS. 16A and 16B are flow-charts of the stereoscopic headlamp control processes in accordance with the present invention.
Figure 16B:
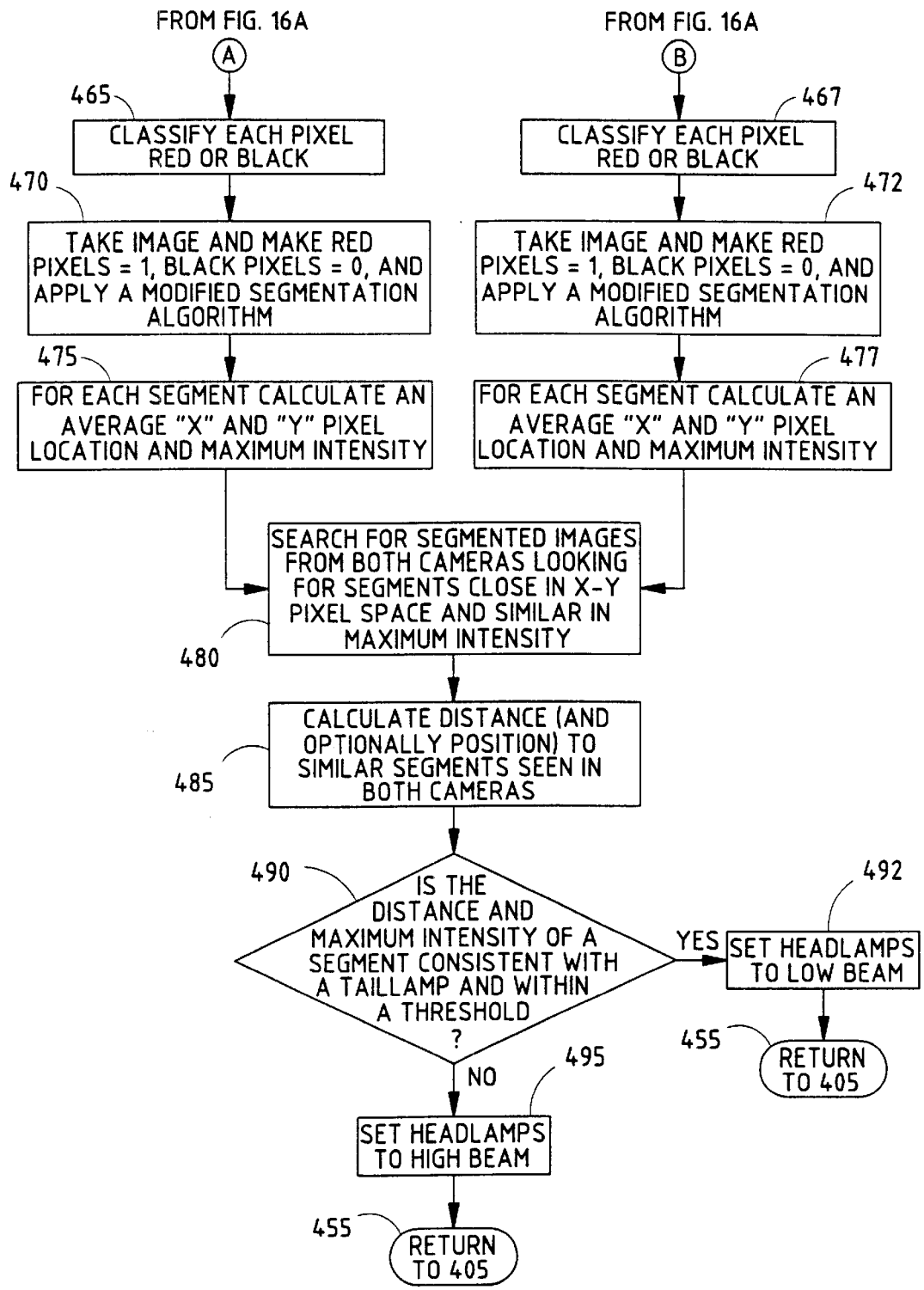

Referring now to FIGS. 16A and 16B, a headlamp control process 400 is shown which starts at 405 by determining whether the ambient light level is below a predetermined threshold. If the light level is below the threshold, then process 400 grabs a color frame at a headlamp shutter setting for both cameras or sensors 34a and 34b at 410 and 412, respectively. Process 400 then classifies each pixel as white or black at 415 and 417 and assigns a value of one to white pixels and a value of zero to black pixels at 420 and 422 or otherwise designates the pixels. The segment labeling algorithm 100 is performed at 420 and 422 for the two sensors 34a and 34b, respectively. An average x and y pixel location and maximum intensity is then calculated according to process 200 at 425 and 427 for each segment on the respective sensors. Headlamp control process 400 then compares the location and intensity of the segmented images from both sensors at 430 in order to determine segments on each sensor which correspond to a particular light source. Control process 400 determines that the segments correspond to a particular light source if the compared segments on both sensors are within an x-y pixel space threshold and intensity threshold, in accordance with process 300, discussed above. The distance to the light source corresponding to the similar segments is then calculated at 440. The angular and/or lateral position of the light source relative to vehicle 10 may also be calculated at 440. It is then determined at 450 whether the distance and maximum intensity of corresponding segments are consistent with a headlamp of an oncoming vehicle and within a predetermined threshold level. The consistency criteria may include a forward and lateral position relative to vehicle 10, intensity, size, or any other criteria which may discern a headlamp form other light sources, such as rate of approach or the like relative to vehicle 10. If it is determined at 450 that the distance, intensity and/or any other selected criteria are within the threshold levels, the headlamps are set to a low beam setting at 452 and the process returns at 455.

If it is determined at 450 that the distance, maximum intensity or other characteristics of the segment are not consistent with a headlamp or within the threshold level, then process 400 grabs color frames at a taillamp shutter setting in camera sensors 34a and 34b at 460 and 462, respectively, using the principles disclosed in U.S. Pat. No 5,796,094, referenced above. Each pixel is then classified as red or black at 465 and 467. The red pixels are then assigned a value of one or otherwise designated, while the black pixels are assigned a value of zero or otherwise designated, at 470 and 472. The segment labeling algorithm 100 is again performed on each of the respective sensors at 470 and 472. An average x and y pixel location and maximum intensity are then calculated according to process 200 at 475 and 477 for each segment on the respective sensors. The segmented images from both cameras are then compared at 480 to determine which segments are close in x-y pixel positioning and similar in maximum intensity between the two sensors. The distance to a light source corresponding to the similar segments in both sensors is then calculated at 485. The lateral position of the light sources may also be determined at 485. It is then determined at 490 if the distance and maximum intensity of the segment are consistent with a taillamp and within a predetermined threshold. Similar to the consistency criteria above with respect to headlamps, the light source may be analyzed to determine if their size, intensity, lateral and vertical position relative to vehicle 10 and/or rate of approach to vehicle 10 are consistent with known or assumed values associated with vehicle taillights. If the distance, maximum intensity and the like are within the threshold levels, the headlamps are set to a low beam at 492 and the process returns to 405 at 455. If, on the other hand, the distance, maximum intensity and/or other selected criteria are not consistent with taillamps or are not within the threshold levels, the headlamps are set to a high beam setting at 495 and the process again returns at 455. Process 400 thus adjusts the headlamp setting in response to the distance and maximum intensity of light sources sensed by both of the sensors 34a and 34b.

Figure 17A:
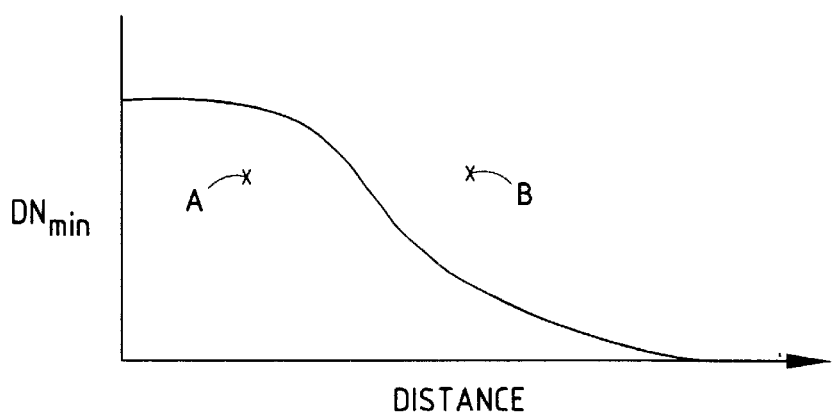
FIGS. 17A–C are curves of segment intensity versus distance useful in determining whether to activate or deactivate the high or low beams of the headlamps.
Figure 17B:
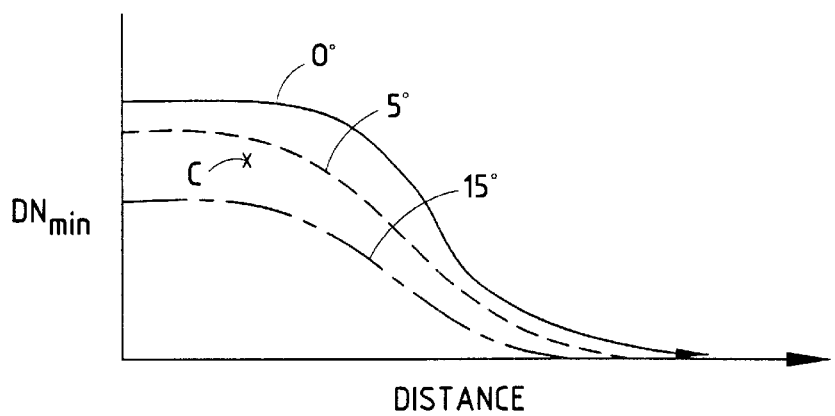
Figure 17C:
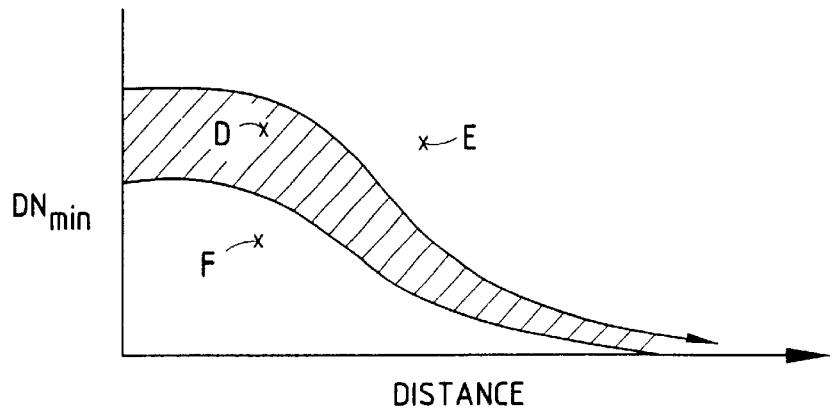

The present invention thus accounts for both the intensity of light sensed by the sensors and the distance to the light source from the vehicle 10, before adjusting the headlamp setting for the vehicle. This allows the vehicle headlamps to remain in a high beam setting until vehicle 10 is within a predetermined range of a sensed headlamp or taillight, and conversely, the headlamps may be set to a high beam setting once a sensed headlamp or taillight moves beyond that predetermined range. By sampling real world data or simulating various driving conditions, a pixel intensity versus distance curve may be created which is typical of headlamps and taillamps for various driving conditions. Such a curve is shown in FIG. 17A, where a segment intensity and corresponding distance at point A below the curve would not be classified as a headlamp, while a signal B, which has similar intensity but greater distance than point A, may be classified as a headlamp. Headlamp control process 400 is then further optimized since certain segments which are not within a range of the real world data curve would not be included in the headlamp analysis. Similarly, as shown in FIG. 17B, real world data may be used to modify the curve such that an angular position of the light source relative to vehicle 10 is further included in the analysis in order determine whether or not the segment should be classified as a headlamp or taillight. For example, the signal C in FIG. 17B would be classified as a headlamp if it is determined to be at approximately a 15° angle relative to vehicle 10, but may not be classified as a headlamp if it is only approximately 0°–5° off of the axis of the sensors 34a and 34b in vehicle 10. The system may be otherwise optimized as shown if FIG. 17C, where a minimum and maximum pixel intensity band 60 versus distance is implemented. With such a band, segments which fall within the shaded area or band 60, such as point D, may be classified as headlamps, while segments falling outside of the band 60, such as points E and F, may not be classified as headlamps by headlamp control process 400. Clearly, the scope of the present invention further includes other thresholds and criteria for determining whether a particular segment should be classified as a headlamp or taillight, with respect to its intensity and distance and/or angle or lateral position relative to vehicle 10.

Therefore, the present invention provides a stereoscopic imaging system useful with various accessory controls or displays which is operable to determine a distance from one or more imaging array sensors to an object or light source remote from the sensors. The stereoscopic imaging system may determine a distance to any object or light source in a targeted scene, without requiring additional equipment or ranging devices. Furthermore, the system may provide a distance determination to a headlamp control, without having to assume that the light source is within a predetermined range of intensities corresponding to a typical intensity of a headlamp or taillight and calculating the distance based on the intensity alone. Accordingly, the imaging system provides a more accurate distance calculation, since it is not affected by variations in the intensity of the light source that is being sensed. The accuracy of the distance calculations may be further enhanced by implementing a segmentation algorithm which determines the average position of the light source as received by the sensor, thereby facilitating sub-pixel resolution for the distance calculations. Furthermore, the distance calculation may be applied equally as well to other images that are not associated with headlamps or taillights of other vehicles. Accordingly, the stereoscopic imaging system described herein may be useful with other vehicular imaging systems, such as rearview vision systems, backup aids, rain sensors or the like.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A vehicular imaging system comprising:
   at least one imaging array sensor mounted at a vehicle and directed outwardly from the vehicle, said at least one imaging array sensor sensing images of at least one object exterior of the vehicle, said at least one imaging array sensor including a first portion for receiving a first image of the at least one object and a second portion for receiving a second image of the at least one object, said first portion and second portion defining a separation distance;
   a first optic element positioned between said first portion and the at least one object and a second optic element positioned between said second portion and the at least one object, said first optic element having a first focal length and said second optic element having a second focal length;
   a control that is responsive to an output of said at least one imaging array sensor in order to capture an image of at least one object external to the vehicle and determine a distance between said at least one imaging array sensor and the at least one object external to the vehicle according to the following equation:

$$D = \frac{\Delta f_1 f_2}{f_1 x_{D2} - f_2 x_{D1}};$$

where D is said distance, $\Delta$ is said separation distance, $f_1$ is said first focal length, $f_2$ is said second focal length, $x_{D1}$ is a directed distance from said first reference point to said first image and $x_{D2}$ is a directed distance from said second reference point to said second image.

2. The vehicular imaging system of claim 1, wherein said control compares a first registration of the first image on said first portion to a second registration of the second image on said second portion, said control determining a deviation between said first and second registrations relative to at least one reference point associated with said at least one imaging array sensor and determining said distance as a function of said deviation and said separation distance associated with said first and second portions, said separation distance being defined between corresponding reference points of said first and second portions.

3. The vehicular imaging system of claim 2, wherein said at least one imaging array sensor is at least one pixelated array sensor defining said first and second portions, said first registration being at least one pixel on said first portion and said second registration being at least one pixel on said second portion.

4. The vehicular imaging system of claim 2, wherein said at least one imaging array sensor is at least one pixelated array sensor defining said first and second portions, said first registration being an average pixel location of said first image and said second registration being an average pixel location of said second image.

5. The vehicular imaging system of claim 1, wherein said at least one imaging array sensor is at least one pixelated array sensor, said control providing sub-pixel resolution to said deviation.

6. The vehicular imaging system of claim 1, wherein said at least one imaging array sensor is a divided imaging array sensor, said first portion being a first region of said divided imaging array sensor and said second portion being a second region of said divided imaging array sensor.

7. The vehicular imaging system of claim 1, wherein said at least one imaging array sensor comprises first and second imaging arrays, said first portion being on said first imaging array and said second portion being on said second imaging array.

8. The vehicular imaging system of claim 1, wherein said first optic element is positioned along a first optic path between said first portion and the object and said second optic element is positioned along a second optic path between said second portion and the object.

9. The vehicular imaging system of claim 8, wherein said at least one imaging array sensor comprises first and second imaging array sensors, said first optic path being between said first imaging array sensor and the at least one object and said second optic path being between said second imaging array sensor and the at least one object.

10. The vehicular imaging system of claim 9 further including a first reflective surface positioned along and defining said first optic path and a second reflective surface positioned along and defining said second optic path, said first and second reflective surface redirecting said first and second images toward said first and second imaging array sensors, respectively.

11. The vehicular imaging system of claim 10, wherein said first and second imaging array sensors face generally opposite to one another, said first and second reflective surfaces redirecting said first and second images toward said first and second imaging array sensors, respectively.

12. The vehicular imaging system of claim 8, wherein said first and second portions are generally coplanar.

13. The vehicular imaging system of claim 12, wherein said at least one imaging array sensor is a divided imaging array sensor, said first portion being a first region of said divided imaging array sensor and said second portion being a second region of said divided imaging array sensor.

14. The vehicular imaging system of claim 12 further including at least one first reflective surface positioned along and defining said first optic path and at least one second reflective surface positioned along and defining said second optic path, said first and second reflective surfaces redirecting said first and second images toward said first and second portions of said imaging array sensor, respectively.

15. The vehicular imaging system of claim 1, wherein said control classifies each of a plurality of images received by said at least one imaging array sensor, said each image being classified according to at least one of a location relative to said at least one imaging array sensor, a size of said image and an intensity of said image.

16. The vehicular imaging system of claim 15 further including at least one color filter associated with said at least one imaging array sensor, said control determining a color of said each image in order to classify said each image.

17. The vehicular imaging system of claim 15, wherein said imaging system is associated with a headlamp control, said images being classified as one of headlamps or taillights.

18. The vehicular imaging system of claim 15, wherein said at least one imaging array sensor comprises at least one pixelated imaging array comprising a plurality of photosensing pixels.

19. The vehicular imaging system of claim 18, wherein said control classifies and labels a plurality of segments representing a plurality of objects in the target scene in response to signals received by said pixels of said at least one pixelated imaging array, said plurality of segments being labeled according to a position on said at least one pixelated imaging array and an intensity of said signals, said control comparing each of said plurality of segments on said first portion with corresponding segments on said second portion in order to determine a deviation between a first relative position of said segments on said first portion and a second relative position of said corresponding segments on said second portion, said distance to each of the plurality of objects being calculated as a function of said deviation and a separation distance associated with said first and second portions.

20. The vehicular imaging system of claim 1, wherein said imaging system is associated with a headlamp control for controlling headlamps on a vehicle, said headlamp control adjusting an output of said headlamps in response to said distance and said output of said at least one imaging array sensor.

21. The vehicular imaging system of claim 1, wherein said imaging system is associated with a rearview imaging system including a display within a vehicle for providing an operator of the vehicle with a display image of the scene rearward of the vehicle, said control communicating a signal associated with said distance to said display.

22. The vehicular imaging system of claim 1, wherein said imaging system is associated with a rain sensor for determining whether precipitation is present on a window of a vehicle, said rain sensor being operable in response to said output of said at least one imaging array sensor and said distance.

23. The vehicular imaging system of claim 1, wherein said imaging system is operable to control a vehicle accessory, said vehicle accessory being at least one of a display for displaying an image of the scene, a distance indicator, a warning indicator, a windshield wiper of the vehicle, headlamps of the vehicle and a brake system of the vehicle.

24. A vehicular imaging system comprising:
at least one imaging array sensor mounted at a vehicle and directed outwardly from the vehicle, said at least one imaging array sensor having distance-sensing capability, said at least one imaging array sensor receiving an image of at least one object, said at least one imaging array sensor including a first portion for receiving a first image of the at least one object and a second portion for receiving a second image of the at least one object, a first reference point of said first portion and a second reference point of said second portion being separated by a separation distance;

a first optic element positioned along a first optic path between said first portion and the at least one object and a second optic element positioned along a second optic path between said second portion and the at least one object, said first optic having a first focal length and said second optic having a second focal length; and a control that is responsive to an output of said at least one imaging array sensor in order to capture an image of the at least one object external to the vehicle and determine a distance between said at least one imaging array sensor and the at least one object, said control determining a first position of said first image relative to said first reference point and a second position of said second image relative to said second reference point, wherein said distance is calculated according to the following equation:

$$D = \frac{\Delta f_1 f_2}{f_1 x_{D2} - f_2 x_{D1}};$$

where D is said distance, $\Delta$ is said separation distance, $f_1$ is said first focal length, $f_2$ is said second focal length, $x_{D1}$ is a directed distance from said first reference point to said first image and $x_{D2}$ is a directed distance from said second reference point to said second image.

25. The vehicular imaging system of claim 24, wherein said first reference point corresponds to a center axis of said first portion and said second reference point corresponds to a center axis of said second portion.

26. The vehicular imaging system of claim 24, wherein said at least one imaging array sensor is a pixelated array sensor, said first and second positions being an average of pixel locations of first and second segments.

27. The vehicular imaging system of claim 1, wherein said control compares a first registration of the first image of the at least one object relative to a first reference point on said at least one imaging array sensor with a second registration of the second image of the at least one object relative to a second reference point on said at least one imaging array sensor in order to determine the distance to the at least one object, said separation distance being defined between corresponding ones of said first and second reference points on said at least one imaging array sensor.

28. A vehicular imaging system comprising:
   at least one imaging array sensor mounted at a vehicle and directed outwardly from the vehicle, said at least one imaging array sensor having stereoscopic distance-sensing capability; and
   a control that is responsive to an output of said at least one imaging array sensor in order to capture an image of at least one object external to the vehicle and determine a distance between said at least one imaging array sensor and the at least one object external to the vehicle, said control being operable to classify each of a plurality of images received by said at least one imaging array sensor, said each image being classified according to at least one of a location relative to said at least one imaging array sensor, a size of said image and an intensity of said image, wherein said control is operable to vary a shutter speed of said at least one imaging array sensor in order to classify said each image according to intensity.

29. The vehicular imaging system of claim 28 further including at least one color filter associated with said at least one imaging array sensor, said control determining a color of said each image in order to classify said each image.

30. The vehicular imaging system of claim 28, wherein said imaging system is associated with a headlamnp control, said images being classified as one of headlamps or taillights.

31. The vehicular imaging system of claim 28, wherein said at least one imaging array sensor is at least one pixelated imaging array comprising a plurality of photo-sensing pixels.

32. The vehicular imaging system of claim 31, wherein said at least one imaging array sensor includes a first portion for receiving a first image of the object and a second portion for receiving a second image of the object.

33. The vehicular imaging system of claim 32, wherein said control classifies and labels a plurality of segments representing a plurality of objects in the target scene in response to signals received by said pixels of said at least one pixelated imaging array, said plurality of segments being labeled according to a position on said at least one pixelated imaging array and an intensity of said signals, said control comparing each of said plurality of segments on said first portion with corresponding segments on said second portion in order to determine a deviation between a first relative position of said segments on said first portion and a second relative position of said corresponding segments on said second portion, said distance to each of the plurality of objects being calculated as a function of said deviation and a separation distance associated with said first and second portions.

34. A vehicular imaging system comprising:
   a first imaging array sensor for receiving a first image of a scene remote from said imaging system;
   a second imaging array sensor for receiving a second image of the scene, said first and second imaging array sensors being positionable relative to one another and defining a separation distance therebetween, said first and second imaging array sensors being pixelated array sensors, each comprising a plurality of photo sensing pixels, and being operable to receive a plurality of signals associated with a plurality of objects in the scene;
   a first optic element positionable along a first optic path between said first imaging array sensor and the scene, said first optic element having a first focal length;
   a second optic element positionable along a second optic path between said second imaging array sensor and the scene, said second optic element having a second focal length; and
   a control operable to determine a distance between an object in the scene and said imaging system, said control determining a first registration of said first image relative to a first reference point on said first imaging array sensor and a second registration of said second image relative to a second reference point on said second imaging array sensor, said control being operable to classify each of said plurality of signals as segments with respect to at least one of intensity, color, size and position on said first and second imaging array sensors and to determine a distance between said imaging system and objects associated with similarly classified signals, said segments being determined by assigning a value to each of said pixels sensing an intensity greater than a predetermined intensity threshold and determining groups of adjacent pixels having the value assigned thereto, said control being operable to determine a maximum intensity and an average pixel location for each said segment on each of said first and second imaging array sensors, said control being further operable to compare first segments on said first imaging array sensor with second segments on said second imaging array sensor, where said first and second segments have maximum intensity and pixel locations within a predetermined threshold, wherein said control calculates said distance to at least one of the plurality of objects according to the following equation:

$$D = \frac{\Delta f_1 f_2}{f_1 x_{D2} - f_2 x_{D1}};$$

where D is said distance, $\Delta$ is said separation distance, $f_1$ is said first focal length, $f_2$ is said second focal length, $x_{D1}$ is a directed distance from said first reference point to an average position of said first segment and $x_{D2}$ is a directed distance from said second reference point to an average position of said second segment.

35. The vehicular imaging system of claim 34, wherein said control further calculates an angular position of the object with respect to said imaging system.

36. The vehicular imaging system of claim 34, wherein said first and second reference points correspond to first and second center axes of said first and second imaging array sensors, respectively.

37. The vehicular imaging system of claim 34, wherein said control further calculates a lateral angular position of at least one of the plurality of objects with respect to said imaging system.

38. The vehicular imaging system of claim 37, wherein said imaging system is associated with a headlamp control, said headlamp control adjusting a headlamp setting in response to at least one of said distance, said angular position, said intensity and a color of the plurality of objects.

39. The vehicular imaging system of claim 38, wherein said headlamp control adjusts said headlamp setting in response to at least one of a rate of approach and a vertical position of the plurality of objects relative to the vehicle.

40. The vehicular imaging system of claim 37, wherein said control calculates said lateral angular position according to the following equation:

$$\theta = \tan^{-1}\left(\frac{x_{D2}}{f_2}\right)$$

where θ is an angle between an axis associated with said second imaging array sensor and a corresponding object.

41. The vehicular imaging system of claim 34, wherein said imaging system is associated with at least one of a vehicular vision system and a rain sensor.

42. A vehicular imaging system comprising:
 a first imaging array sensor for receiving a first image of a scene remote from said imaging system;
 a second imaging array sensor for receiving a second image of the scene, said first and second imaging array sensors being positionable relative to one another and defining a separation distance therebetween, said first and second imaging array sensors being pixelated imaging array sensors;
 a first optic element positionable along a first optic path between said first imaging array sensor and the scene, said first optic element having a first focal length;
 a second optic element positionable along a second optic path between said second imaging array sensor and the scene, said first optic element having a second focal length; and
 a control operable to determine a distance between an object in the scene and said imaging system, said control determining a first registration of said first image relative to a first reference point on said first imaging array sensor and a second registration of said second image relative to a second reference point on said second imaging array sensor, said control being operable to compare individual pixels on said first imaging array sensor with similarly illuminated individual pixels on said second imaging array sensor, wherein said control calculates said distance to at least one of the plurality of objects according to the following equation:

$$D = \frac{\Delta f_1 f_2}{f_1 x_{D2} - f_2 x_{D1}};$$

where D is said distance, Δ is said separation distance, $f_1$ is said first focal length, $f_2$ is said second focal length, $X_{D1}$ is a directed distance from said first reference point to a registration of said individual pixel on said first imaging array sensor and $x_{D2}$ is a directed distance from said second reference point to a registration of said individual pixel on said second imaging array sensor.

43. The vehicular imaging system of claim 42, wherein said first and second reference points correspond to first and second center axes of said first and second imaging array sensors, respectively.

44. A vehicular headlamp control for controlling a headlamp of a vehicle, said headlamp control comprising:
 at least one imaging array sensor adaptable to receive stereoscopic images forward of the vehicle, said at least one imaging array sensor including a first portion and a second portion, said first portion receiving a first image of the light sources and said second portion receiving a second image of the light sources, said first portion being associated with a first reference point and said second portion being associated with a second reference point, a separation distance being defined by said first and second reference points;
 first and second optic elements, said first optic element having a first focal length and being positioned along a first optic path between the light sources and said first portion, said second optic element having a second focal length and being positioned along a second optic path between the light sources and said second portion; and
 a control responsive to said at least one imaging array sensor to identify light sources of interest and provide a control output to the vehicle, said control calculating a distance between at least one of the light sources of interest and said at least one imaging array sensor and providing said control output in response to said distance, said headlamp control controlling the headlamps of the vehicle in response to said control output, wherein said distance is calculated according to the following equation:

$$D = \frac{\Delta f_1 f_2}{f_1 x_{D2} - f_2 x_{D1}};$$

where D is said distance, Δ is said separation distance, $f_1$ is said first focal length, $f_2$ is said second focal length, $x_{D1}$ is a directed distance from said first reference point to said first image and $x_{D2}$ is a directed distance from said second reference point to said second image.

45. The vehicular headlamp control of claim 44, wherein said first reference point corresponds to a center axis of said first portion and said second reference point corresponds to a center axis of said second portion.

46. The vehicular headlamp control of claim 44, wherein said control further calculates an angular position of at least one of the light sources with respect to said headlamp control, said headlamp control controlling the headlamps of the vehicle in response to at least one of said angular position and said distance of the at least one light source relative to the vehicle.

47. The vehicular headlamp control of claim 46, wherein said headlamp control adjusts a setting of the headlamps in response to at least one of an intensity of the at least one light source, a color of the at least one light source, said distance between said headlamp control and the at least one light source, said angular position of the at least one light source relative to the vehicle, and a rate of approach of the at least one light source relative to the vehicle.

48. The vehicular headlamp control of claim 44, wherein said first image is an average position of a first portion of said first image associated with the light sources and said second image is an average position of a second portion of said second image associated with the light sources.

49. The vehicular headlamp control of claim 44, wherein said at least one imaging array sensor is a pixelated imaging array sensor, said first image being an individual pixel location associated with one of the light sources and said second image being an individual pixel location associated with the one light source.

50. A vehicular headlamp control for controlling a headlamp of a subject vehicle, said headlamp control comprising:
  a distance sensor comprising at least one pixelated CMOS imaging array sensor having a plurality of pixels adaptable to receive images of light sources forward of the vehicle, said distance sensor being operable to calculate a distance between at least one light source of interest and said distance sensor; and
  a control responsive to said at least one imaging array sensor and operable to identify the light sources of interest as headlamps or taillights and to provide a control output to the vehicle, said control being responsive to said distance sensor to modulate the headlamps at least between a high beam state and a low beam state of the headlamps of the subject vehicle in response to the calculated distance between the at least one light source of interest and said distance sensor, wherein said headlamp control is mounted within a rear view mirror assembly of the vehicle, said at least one imaging array sensor being directed forwardly of the vehicle to receive the image therefrom.

51. The vehicular headlamp control of claim 50, wherein said distance sensor provides sub-pixel resolution to the distance calculation.

52. A rearview vision system for a vehicle comprising:
  at least one imaging array sensor positioned on the vehicle and directed rearwardly with respect to the direction of travel of the vehicle, said at least one imaging array sensor having stereoscopic distance-sensing capability, a first portion of said at least one imaging array sensor receiving a first image of the at least one object and a second portion of said at least one imaging array sensor receiving a second image of the at least one object, said first portion is associated with a first reference point and said second portion is associated with a second reference point, a separation distance being defined by said first and second reference points;
  first and second optic elements, said first optic element having a first focal length and being positioned along a first optic path between the at least one object and said first portion, said second optic element having a second focal length and being positioned along a second optic path between the at least one object and said second portion; and
  a control operable to calculate a distance to at least one object rearward of the vehicle in response to an output of said at least one imaging array sensor, wherein said distance is calculated according to the following equation:

$$D = \frac{\Delta f_1 f_2}{f_1 x_{D2} - f_2 x_{D1}};$$

where D is said distance, Δ is said separation distance, $f_1$ is said first focal length, $f_2$ is said second focal length, $x_{D1}$ is a directed distance from said first reference point to said first image and $x_{D2}$ is a directed distance from said second reference point to said second image.

53. The rearview vision system of claim 52, wherein said first reference point corresponds to a center axis of said first portion and said second reference point corresponds to a center axis of said second portion.

54. The rearview vision system of claim 52, wherein said control further calculates an angular position of said at least one object with respect to said rearview vision system.

55. The rearview vision system of claim 52, wherein said first image is an average position of a portion of said first image associated with the at least one object and said second image is an average position of a portion of said second image associated with the at least one object.

56. The rearview vision system of claim 52, wherein said at least one imaging array sensor is a pixelated imaging array sensor, said first image being a first individual pixel location associated with the at least one object and said second image being a second individual pixel location associated with the at least one object.

57. The rearview vision system of claim 52, wherein said at least one imaging array sensor comprises a pixelated imaging array sensor, said control providing sub-pixel resolution to the distance calculation.

58. The rearview vision system of claim 52, wherein said at least one imaging array sensor is positioned within a rear view mirror assembly on the vehicle and directed rearwardly therefrom.

59. The rearview vision system of claim 52, wherein said at least one imaging array sensor is positioned at a rearward portion of the vehicle and directed rearwardly therefrom.

60. The rearview vision system of claim 52, wherein said at least one imaging array sensor comprises first and second imaging array sensors, said first imaging array sensor being positioned at a first side of the vehicle and said second imaging array sensor being positioned at a second side of the vehicle, said first imaging array sensor including said first portion and said second imaging array sensor including said second portion.

61. The rearview vision system of claim 60 further including a display system which displays an image synthesized from an output of said first and second imaging array sensors and which approximates a rearward-facing substantially seamless panoramic view from a single location substantially without duplicate redundant images of objects.

62. The rearview vision system of claim 52 further including a display system which displays an image synthesized from said output of said at least one imaging array sensor.

63. The rearview vision system of claim 62, wherein said rearview vision system is operable to produce a graphic overlay superimposed on said display.

64. The rearview vision system of claim 63, wherein said graphic overlay includes distance indicia indicating distances to the at least one object rearward of the vehicle.

65. The rearview vision system of claim 64, wherein said distance indicia comprises at least one horizontal mark.

66. The rearview vision system of claim 64, wherein said control adjusts said distance indicia in response to at least one of the vehicle's steering system, the vehicle's differential system and a compass.

67. The rearview vision system of claim 62, wherein said rearview vision system is operable to provide an additional enhancement to the displayed image.

68. The rearview vision system of claim 67, wherein said additional enhancement includes visually distinguishing images of objects within a threshold distance to the vehicle.

69. The rearview vision system of claim 68, wherein said additional enhancement includes at least one of displaying the objects in a particular color and flashing the image of the objects.

70. A vehicular headlamp control for controlling a headlamp of a subject vehicle, said headlamp control comprising:
  a distance sensor comprising at least one pixelated CMOS imaging array sensor having a plurality of pixels adaptable to receive images of light sources forward of the vehicle, said distance sensor being operable to calculate a distance between at least one light source of interest and said distance sensor; and a control responsive to said at least one imaging array sensor and operable to identify the light sources of interest as headlamps or taillights and to provide a control output to the vehicle, said control being responsive to said distance sensor to modulate the headlamps at least between a high beam state and a low beam state of the headlamps of the subject vehicle in response to the calculated distance between the at least one light source of interest and said distance sensor, said control being operable to classify each of the images received by said at least one imaging array sensor, said each image being classified according to at least one of a location relative to said distance sensor, a size of said image and an intensity of said image, wherein said control is operable to vary a shutter speed of said at least one imaging array sensor in order to classify said each image according to intensity.

71. The vehicular headlamp control of claim 70, wherein said control determines if an intensity of the at least one light source of interest is within a threshold intensity level and if said distance is within a threshold distance range from the vehicle, said control modulating the state of the headlamps of the subject vehicle in response to said intensity and said distance of the at least one light source of interest.

72. The vehicular headlamp control of claim 71, wherein said threshold intensity level and threshold distance level are different between a headlamp and a taillight determination.

73. The vehicular headlamp control of claim 71 further including at least one color filter associated with said at least one imaging array sensor, said control determining a color associated with the at least one light source of interest, said control modulating the state of the headlamps of the subject vehicle in response to said color, said intensity level and said distance.

74. The vehicular headlamp control of claim 71, wherein said control determines a lateral angular position of the at least one light source of interest relative to the vehicle, said control modulating the state of the headlamps of the subject vehicle in response to said intensity level, said distance and said angular position.

75. The vehicular headlamp control of claim 74 further including at least one color filter associated with said at least one imaging array sensor, said control determining a color associated with the at least one light source of interest, said control modulating the state of the headlamps of the subject vehicle in response to said color, said lateral angular position, said intensity level and said distance.

76. The vehicular headlamp control of claim 75, wherein said control modulates the state of the headlamps of the subject vehicle in response to at least one of a rate of approach and a vertical position of the at least one light source of interest relative to the vehicle.

77. The vehicular headlamp control of claim 70, wherein said at least one imaging array sensor comprises a first portion and a second portion, said first portion receiving a first image of the light sources and said second portion receiving a second image of the light sources.

78. The vehicular headlamp control of claim 77 further including first and second optic elements, said first optic element having a first focal length and being positioned along a first optic path between the light sources and said first portion, said second optic element having a second focal length and being positioned along a second optic path between the light sources and said second portion.

79. The vehicular headlamp control of claim 78, wherein said first portion is associated with a first reference point and said second portion is associated with a second reference point, a separation distance being defined by said first and second reference points, said distance sensor calculating said distance as a function of said separation distance and said first and second focal lengths.

80. The vehicular headlamp control of claim 78, wherein said headlamp control is mounted within a rear view mirror assembly of the vehicle, said at least one imaging array sensor being directed forwardly of the vehicle to receive the stereoscopic image therefrom.

81. The vehicular headlamp control of claim 80, wherein said at least one imaging array sensor comprises a divided imaging array sensor, said first portion being a first region of said divided imaging array sensor and said second portion being a second region of said divided imaging array sensor.

82. The vehicular headlamp control of claim 80, wherein said at least one imaging array sensor comprises first and second imaging arrays, said first portion being on said first imaging an array and said second portion being on said second imaging array.

83. The vehicular headlamp control of claim 82 further including a first reflective surface positioned along and defining said first optic path and a second reflective surface positioned along and defining said second optic path.

84. The vehicular headlamp control of claim 83, wherein said first and second imaging arrays face generally opposite to one another, said first and second reflective surfaces redirecting said first and second images toward said first and second imaging arrays, respectively.

85. The vehicular headlamp control of claim 80, wherein said first and second portions are generally coplanar.

86. The vehicular headlamp control of claim 85 further including first and second reflective surfaces positioned along said first and second optic paths, respectively, said first and second reflective surfaces directing the first and second images toward said first and second portions of said at least one imaging array sensor, respectively.

87. The vehicular headlamp control of claim 70 further including at least one color filter associated with said at least one imaging array sensor, said control determining a color of said each image in order to classify said each image.

88. The vehicular headlamp control of claim 70, wherein said control classifies and labels a plurality of segments representing a plurality of light sources in the target scene in response to signals received by said pixels of said at least one pixelated CMOS imaging array sensor, said plurality of segments being labeled according to a position on said at least one pixelated CMOS imaging array sensor and an intensity of said signals.

89. The vehicular headlamp control of claim 88, wherein said at least one pixelated CMOS imaging array sensor includes first and second portions, each of said first and second portions receiving respective first and second images of the light sources.

90. A vehicular headlamp control for controlling a headlamp of a subject vehicle, said headlamp control comprising:

a distance sensor comprising at least one pixelated CMOS imaging array sensor having a plurality of pixels adaptable to receive images of light sources forward of the vehicle, said distance sensor being operable to calculate a distance between at least one light source of interest and said distance sensor, said at least one pixelated CMOS imaging array sensor including first and second portions, each of said first and second portions receiving respective first and second images of the light sources; and a control responsive to said at least one imaging array sensor and operable to identify the light sources of interest as headlamps or taillights and to provide a control output to the vehicle, said control being responsive to said distance sensor to modulate the headlamps at least between a high beam state and a low beam state of the headlamps of the subject vehicle in response to the calculated distance between the at least one light source of interest and said distance sensor, said control being operable to classify each of the images received by said at least one imaging array sensor, said each image being classified according to at least one of a location relative to said distance sensor, a size of said image and an intensity of said image, said control classifying and labeling a plurality of segments representing a plurality of light sources in the target scene in response to signals received by said pixels of said at least one pixelated CMOS imaging array sensor, said plurality of segments being labeled according to a position on said at least one pixelated CMOS imaging array sensor and an intensity of said signals, wherein said distance sensor compares each of said plurality of segments on said first portion with corresponding segments on said second portion in order to determine a deviation between a first relative position of said segments on said first portion and a second relative position of said corresponding segments on said second portion, said distance to each of the plurality of objects being calculated as a function of said deviation and a separation distance associated with said first and second portions.

* * * * *

UNITED STATES PATENT AND TRADEMARK OFFICE
CERTIFICATE OF CORRECTION

PATENT NO. : 6,396,397 B1 Page 1 of 1
DATED : May 28, 2002
INVENTOR(S) : Brent J. Bos and Kenneth Schofield It is certified that error appears in the above-identified patent and that said Letters Patent is hereby corrected as shown below:

Column 1,
Line 11, "5,550,667" should be -- 5,550,677 --

Column 6,
Line 35, "'394" should be -- '094 --

Column 8,
Line 37, "futher" should be -- further --

Column 26,
Line 21, delete "an" after "imaging"

Signed and Sealed this

Twenty-fifth Day of May, 2004

JON W. DUDAS
*Acting Director of the United States Patent and Trademark Office*